United States Patent
Marumo

(10) Patent No.: US 11,210,646 B2
(45) Date of Patent: Dec. 28, 2021

(54) PRODUCT MANAGEMENT APPARATUS AND PRODUCT MANAGEMENT METHOD BY PRODUCT MANAGEMENT APPARATUS

(71) Applicant: TOSHIBA TEC KABUSHIKI KAISHA, Tokyo (JP)

(72) Inventor: Nobuyuki Marumo, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/891,214

(22) Filed: Jun. 3, 2020

(65) Prior Publication Data
US 2021/0049573 A1 Feb. 18, 2021

(30) Foreign Application Priority Data
Aug. 13, 2019 (JP) .............................. JP2019-148595

(51) Int. Cl.
*G06Q 20/20* (2012.01)
*H04W 4/35* (2018.01)

(52) U.S. Cl.
CPC ............ *G06Q 20/208* (2013.01); *H04W 4/35* (2018.02)

(58) Field of Classification Search
CPC .............................. G06Q 20/208; H04W 4/35
See application file for complete search history.

(56) References Cited

U.S. PATENT DOCUMENTS

| | | | | |
|---|---|---|---|---|
| 6,294,997 B1* | 9/2001 | Paratore | ............. | G06K 19/0717 235/385 |
| 7,463,147 B1* | 12/2008 | Laffoon | ................. | G06Q 10/08 235/383 |
| 9,461,898 B2* | 10/2016 | Ortega-Binderberger | ................... | H04W 12/06 |
| 2008/0011836 A1* | 1/2008 | Adema | .................. | G06Q 10/00 235/383 |
| 2010/0205225 A1* | 8/2010 | Ahlig | ...................... | G06Q 10/10 707/803 |
| 2016/0300285 A1* | 10/2016 | Gandhi | .............. | G06K 19/0723 |
| 2018/0315034 A1* | 11/2018 | Clark | .................... | G06Q 20/208 |
| 2019/0311322 A1* | 10/2019 | DeJarnette | ............ | H04W 4/021 |

FOREIGN PATENT DOCUMENTS

JP 2005-174034 A 6/2005

OTHER PUBLICATIONS

Tian et al. "Robust Detection of Abandoned and Removed Objects in Complex Surveillance Videos". IEEE Transactions on Systems, Man, and Cybernetics, Part C (Applications and Reviews), vol. 41, No. 5, pp. 565-576, Sep. 2011. (Year: 2011).*

Herbon et al. Monitoring perishable inventory using quality status and predicting automatic devices under various stochastic environmental scenarios. Journal of Food Engineering, vol. 223, pp. 236-247. (Year: 2018).*

* cited by examiner

*Primary Examiner* — Nathan A Mitchell
(74) *Attorney, Agent, or Firm* — Kim & Stewart LLP

(57) ABSTRACT

According to an embodiment, a product management apparatus specifies a to-be-purchased product. The product management apparatus measures, where the specified product is a time-sensitive product, an elapsed time since the to-be-purchased product has been specified. The product management apparatus issues a notification in accordance with the measured elapsed time.

10 Claims, 27 Drawing Sheets

532

| TIME PERIOD | REFRIGERATION WARNING PERIOD | FREEZING WARNING PERIOD |
|---|---|---|
| 1201-0320 | T11 | T21 |
| 0321-0610 | T12 | T22 |
| 0611-0915 | T13 | T23 |
| 0916-1130 | T14 | T24 |

| PRODUCT CODE | PRODUCT NAME | UNIT PRICE | PRODUCT CATEGORY | REFRIGERATED CATEGORY | FROZEN CATEGORY |
| --- | --- | --- | --- | --- | --- |
| 1001 | AAAA | 198 | CONFECTION-ARY | 0 | 0 |
| 1002 | BBBB | 128 | DAIRY PRODUCTS | 1 | 0 |
| 1003 | CCCC | 148 | FROZEN DESSERTS | 0 | 1 |
| ········· | ········· | ········· | ········· | ········· | ········· |

| CART ID | PRODUCT CODE | PRODUCT NAME | UNIT PRICE | QUANTITY | AMOUNT OF MONEY | PRODUCT CATEGORY | REFRIGERATED CATEGORY |
|---|---|---|---|---|---|---|---|
| | | | | | | | |
| | | | | | | | |
| | ********** | ********** | ********** | ********** | ********** | ********** | ********** |

| CART ID | REFRIGERATION STATUS | REFRIGERATION WARNING PERIOD | REFRIGERATION TIMER | FREEZING STATUS | FREEZING WARNING PERIOD | FREEZING TIMER |
|---|---|---|---|---|---|---|
| 001 | S1 | T1x | T1 | S2 | T2x | T2 |
| 002 | S1 | T1x | T1 | S2 | T2x | T2 |
| ...... | ...... | ...... | ...... | ...... | ...... | ...... |
| 999 | S1 | T1x | T1 | S2 | T2x | T2 |

| CART ID | REFRIGERATED FOOD HOUSING PERIOD | FROZEN FOOD HOUSING PERIOD | SYMBOL |
|---|---|---|---|
| 001 | U1 | U2 | X·O·A·W |

Fig. 11

|   |   |   |   |   |
|---|---|---|---|---|
| ID:001 | | | | |
| | PRODUCT NAME | UNIT PRICE | NUMBER | AMOUNT OF MONEY |
| | AAAA | \ 198 | 1 | \ 198 |
| [REFRIGERATED] | BBBB | \ 128 | 1 | \ 128 |
| [FROZEN] | CCCC | \ 148 | 1 | \ 148 |

SL2

AR1

| TOTAL | 3 | 474 YEN |
|---|---|---|

AR2

| ELAPSED TIME SINCE REFRIGERATED FOOD HAS BEEN REGISTERED | : T1 | PAY |
|---|---|---|
| ELAPSED TIME SINCE FROZEN FOOD HAS BEEN REGISTERED | : T2 | |

AR3

BT1

Fig. 23

PRODUCT MANAGEMENT APPARATUS AND PRODUCT MANAGEMENT METHOD BY PRODUCT MANAGEMENT APPARATUS

CROSS-REFERENCE TO RELATED APPLICATIONS

This application is based upon and claims the benefit of priority from the prior Japanese Patent Application No. 2019-148595, filed on Aug. 13, 2019, the entire contents of which are incorporated herein by reference.

FIELD

An embodiment to be described here generally relates to a product management apparatus and a product management method by the product management apparatus.

BACKGROUND

In general, in a grocery section of a supermarket, an area where products are displayed, a so-called product display area, and an area where payment is performed, a so-called payment area are distinguished from each other. A customer who is a purchaser selects a product to be purchased, i.e., a to-be-purchased product, from the product display area. When the customer has finished selecting all to-be-purchased products, he/she goes to a payment area and pays for the to-be-purchased products. After finishing the payment, the customer packs the purchased products, for example. At this time, if the purchased products include frozen foods such as microwave meals and ice cream, or refrigerated foods such as raw meat, sashimi, and milk, most customers get dry ice, ice, or the like from the store, and pack them together with the purchased products. By doing so, the customers prevent the frozen foods from melting or the freshness of the refrigerated foods from falling when they bring the purchased products home.

Incidentally, it is after payment that the customers can pack frozen foods or refrigerated foods, which are purchased products, together with dry ice or the like. For this reason, if a customer selects a frozen food or a refrigerated food as a to-be-purchased product immediately after starting shopping, the frozen food or the refrigerated food will warm depending on the time taken for subsequent shopping, and the quality of the frozen food or refrigerated food will deteriorate. Such a problem can occur as long as not only the purchased product is a frozen food or a refrigerated food but also the quality of the purchased product deteriorates over time.

BRIEF DESCRIPTION OF THE DRAWINGS

FIG. 6 is a schematic diagram illustrating a main data structure of a product master table according to the embodiment;

FIG. 8 is a schematic diagram illustrating a main data structure of a transaction file according to the embodiment;

FIG. 9 is a schematic diagram illustrating a main data structure of a cart management table according to the embodiment;

FIG. 11 is a schematic diagram illustrating an example of a tag image displayed on a touch panel of the monitoring terminal according to the embodiment;

FIG. 23 is a schematic diagram illustrating an example of the product registration screen displayed on the touch panel of the information terminal according to the embodiment;

DETAILED DESCRIPTION

Figure 1:
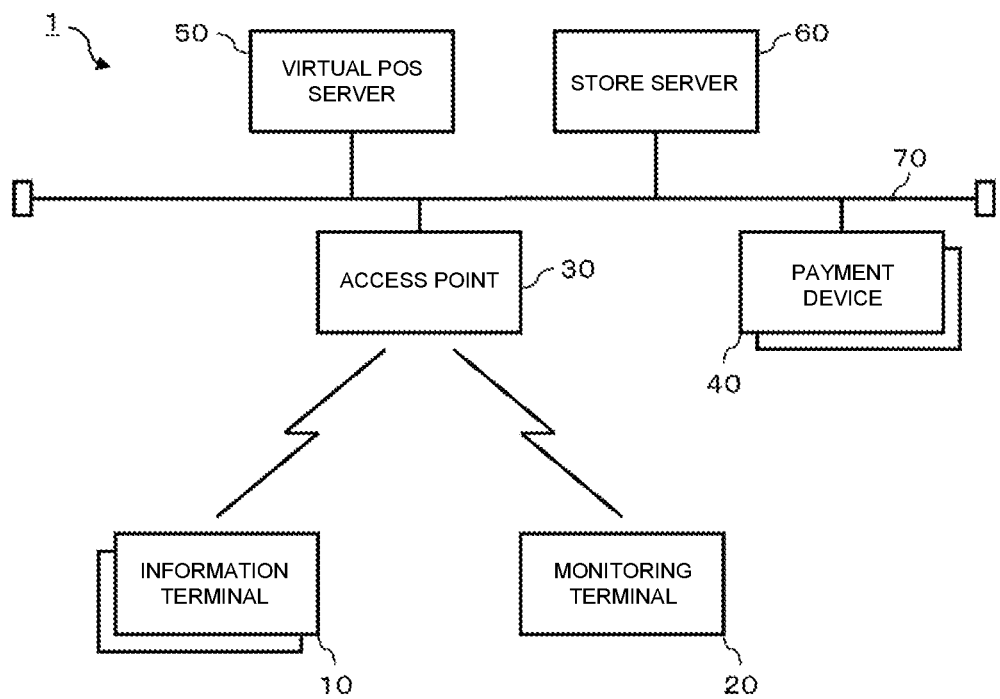
FIG. 1 is an overall configuration diagram of a self-registration system according to an embodiment.

According to an embodiment, a product management apparatus includes: a communication interface; a timer; and a processor. The communication interface transmits/receives a command to/from an outside, the received command including a product registration command including a product code for specifying a to-be-purchased product, the transmitted command including a notification command according to an elapsed time. The timer measures time. The processor detects the product code from the product registration command received via the communication interface to specify a product as a to-be-purchased product on a basis of the detected product code. The processor measures, where the specified to-be-purchased product is a time-sensitive product, an elapsed time since the to-be-purchased product has been specified by using the timer. Further, the processor transmits, via the communication interface, the notification command in accordance with the measured elapsed time.

Hereinafter, a product management apparatus according to an embodiment capable of managing a to-be-purchased product so that the quality of the to-be-purchased product does not significantly deteriorate from the time when a customer selects the to-be-purchased product to the time when payment is finished will be described with reference to the drawings. In the drawings, the same reference symbols indicate the same or similar components.

Note that in this embodiment, a self-registration system 1 in which a customer who uses a shopping cart at a product display area of a store is capable of operating an information terminal provided in the shopping cart to register sales data of a to-be-purchased product by himself/herself is illustrated. The product management apparatus is realized by a virtual point of sales (POS) server 50 (see FIG. 1) of the self-registration system 1.

Figure 2:
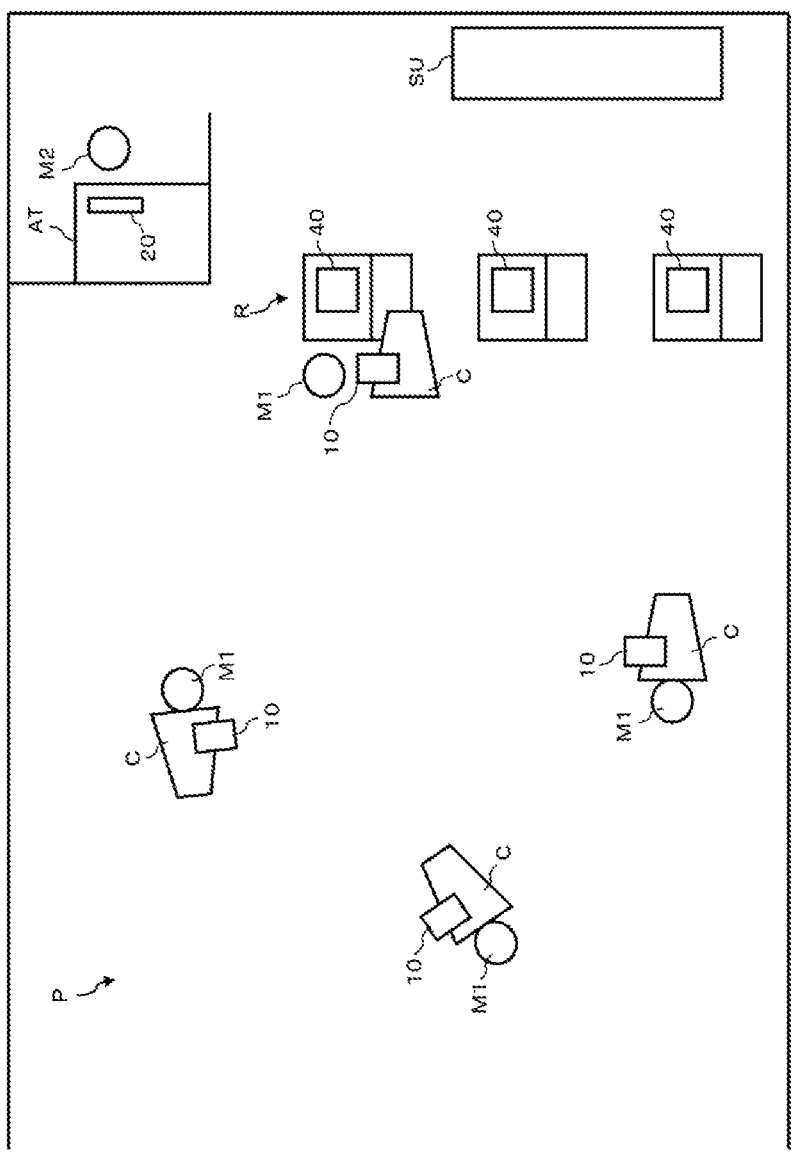
FIG. 2 is a schematic diagram illustrating a layout example of a store in which the self-registration system according to the embodiment has been introduced.

FIG. 1 illustrates an overall configuration of the self-registration system 1 according to this embodiment. FIG. 2 schematically illustrates a layout example of a store in which the self-registration system 1 according to this embodiment has been introduced. An outline of the self-registration system 1 will be described first with reference to FIG. 1 and FIG. 2.

As shown in FIG. 1, the self-registration system 1 includes an information terminal(s) 10, a monitoring terminal 20, an access point 30, a payment device(s) 40, a virtual POS server 50, a store server 60, and a network 70. The network 70 is, for example, a local area network (LAN). In the self-registration system 1, the access point 30, the payment device 40, the virtual POS server 50, and the store server 60 are connected to the network 70.

The information terminal 10 is a terminal that enables a customer who is a purchaser to input data relating to registration of a to-be-purchased product by himself/herself. As shown in FIG. 2, the information terminals 10 are attached to a shopping cart C that is movable in a product display area P together with a customer M1. Hereinafter, the shopping cart C will be referred to simply as the cart C. The cart C is an example of a transport body that transports a to-be-purchased product of the customer M1 who is a user of the cart C.

The monitoring terminal 20 displays an image representing the state of each of the information terminals and the payment devices 40. As shown in FIG. 2, the monitoring terminal 20 is provided in an attendant counter AT. An attendant M2 who is a clerk in charge of waiting on customers stays at the attendant counter AT. The attendant M2 uses the monitoring terminal 20 to monitor the state of each of the information terminals 10 and the payment devices 40.

Each of the information terminals 10 and the monitoring terminal 20 has a wireless unit for performing wireless communication with the access point 30. The access point 30 relays communication between the information terminals 10, the monitoring terminal 20, and each device connected to the network 70. Although only one access point 30 is shown in FIG. 1, two or more access point 30 may be provided depending on the size of the store or the like.

The payment device 40 is a terminal that enables a customer to pay for a to-be-purchased product by himself/herself. The payment device 40 is, for example, a well-known semi-self-service payment device. Alternatively the payment device 40 may be a self-service POS terminal.

As shown in FIG. 2, the payment devices 40 are installed in a payment area R. The customer M1 who has registered a to-be-purchased product using the information terminal 10 by himself/herself goes to the payment area R and pays for the to-be-purchased product by an open payment device 40. After finishing the payment, the customer M1 packs the purchased product on a sacker table SU as necessary.

The virtual POS server 50 is a computer that cooperates with the information terminal 10 to support it so that the information terminal 10 appears as if it functioned as a POS terminal. The virtual POS server 50 realizes, in information processing for the support, the function as a product management apparatus capable of preventing the quality of a to-be-purchased product from deteriorating during the time from when the to-be-purchased product was selected to when the payment is finished. This function will be described below.

The store server 60 is a computer for supporting all store operations. For example, the store server 60 acquires, from the payment device 40 or the virtual POS server 50, sales data, discard data, inventory data, order data, and the like. The store server 60 processes these pieces of data to support store operations such as sales management, inventory management, and order management.

The virtual POS server 50 and the store server 60 are usually installed in a store office or the like. However, the installation location of each of the virtual POS server 50 and the store server 60 is not particularly limited. For example, the virtual POS server 50 and the store server 60 may be provided on a cloud service provided via the Internet. Further, the function as the virtual POS server 50 and the function as the store server 60 may be realized by one server computer. Alternatively, three or more server computers may be used to implement the functions of the virtual POS server 50 and the store server 60 in a distributed manner.

Figure 3:
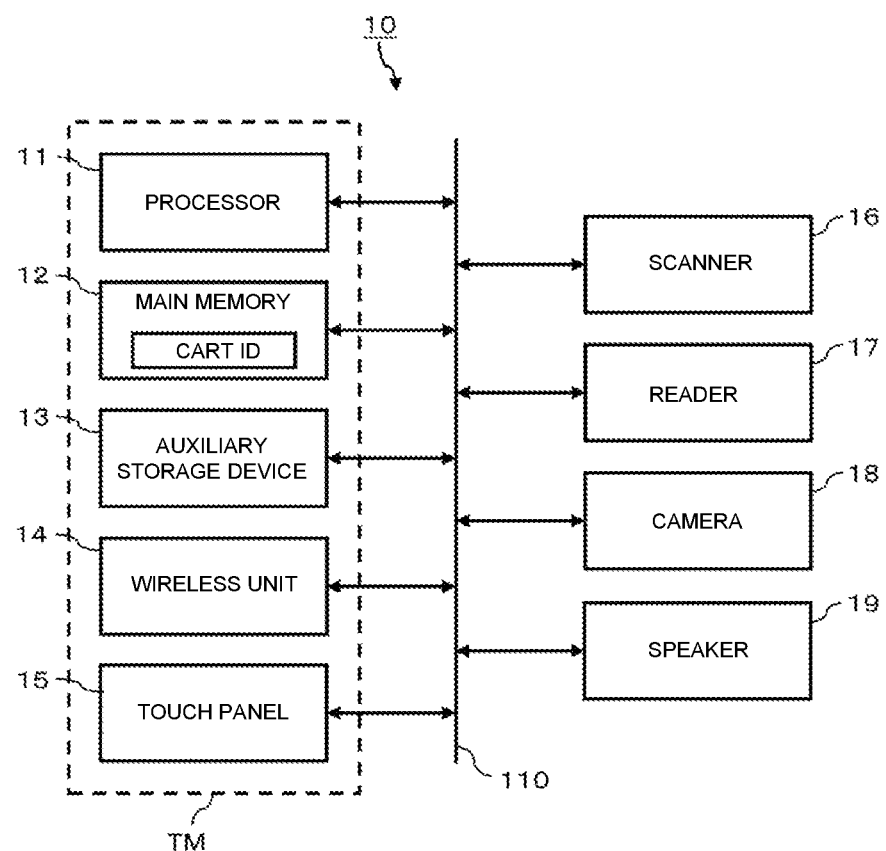
FIG. 3 is a block diagram illustrating a main circuit of an information terminal according to the embodiment.

Next, the information terminal 10, the monitoring terminal 20, and the virtual POS server 50 will be described in detail. FIG. 3 illustrates a main circuit of the information terminal 10. As shown in FIG. 3, the information terminal 10 includes a processor 11, a main memory 12, an auxiliary storage device 13, a wireless unit 14, a touch panel 15, a scanner 16, a reader 17, a camera 18, a speaker 19, and a system transmission path 110. The system transmission path 110 includes an address bus, a data bus, a control signal line, and the like. In the information terminal 10, the processor 11, the main memory 12, the auxiliary storage device 13, the wireless unit 14, the touch panel 15, the scanner 16, the reader 17, the camera 18, and the speaker 19 are connected to the system transmission path 110. In the information terminal 10, the processor 11, the main memory 12, the auxiliary storage device 13, and the system transmission path 110 that connects them configure a computer.

The processor 11 corresponds to the central part of the computer. The processor 11 controls the respective units in accordance with an operating system or an application program to realize various functions as the information terminal 10. The processor 11 is, for example, a central processing unit (CPU).

The main memory 12 corresponds to the main storage part of the computer. The main memory 12 includes a non-volatile memory area and a volatile memory area. The main memory 12 stores, in the non-volatile memory area, an operating system or an application program. The main memory 12 stores, in the non-volatile memory area, cart identification data (hereinafter, referred to as the cart ID). The cart ID is a unique code set for each of the information terminals 10 in order to identify the information terminal 10 provided in the respective carts C. The main memory 12 stores, in the volatile memory, data necessary for the processor 11 to execute processing for controlling the respective units. Such data is stored in the non-volatile memory area of the main memory 12 in some cases. The volatile memory area of the main memory 12 is used also as a work area in which data is rewritten by the processor 11 as appropriate. The non-volatile memory area of the main memory 12 is, for example, a read only memory (ROM). The volatile memory area of the main memory 12 is, for example, a random access memory (RAM).

The auxiliary storage device 13 corresponds to an auxiliary storage part of the computer. The auxiliary storage device 13 includes, for example, an electric erasable programmable read-only memory (EEPROM), a hard disc drive (HDD), a solid state drive (SSD), or the like. The auxiliary storage device 13 stores data to be used by the processor 11 to execute various types of processing, data generated by the processing by the processor 11, or the like. The auxiliary storage device 13 stores the above-mentioned application program in some cases.

The application program stored in the main memory 12 or the auxiliary storage device 13 includes a control program describing information processing to be executed by the information terminal 10. The method of installing the control program in the main memory 12 or the auxiliary storage device 13 is not particularly limited. The control program can be installed in the main memory 12 or the auxiliary storage device 13 by recording the control program on a removable recording medium or distributing the control program by communication via a network. The form of the recording medium is not limited as long as the recording medium is capable of storing a program, as in a CD-ROM, a memory card, or the like, and can be read by an apparatus.

The wireless unit 14 performs wireless communication of data with the access point 30 in accordance with a wireless communication protocol.

The touch panel 15 is a device that functions as both an input device and a display device of the information terminal 10. The touch panel 15 detects a touch position with respect to the displayed image and outputs information regarding the touch position to the processor 11.

The scanner 16 reads a code symbol such as a barcode or a two-dimensional data code attached to a product. A product is provided with a code symbol specific to the product. The scanner 16 outputs data of the read code symbol to the processor 11. The scanner 16 may be one that reads a code symbol by scanning with a laser beam, or may be one that reads a code symbol from an image captured by an imaging device.

The reader 17 reads data recorded on a recording medium and outputs the read data to the processor 11. The reader 17 is a magnetic card reader in the case where the recording medium is a magnetic card, and is an IC card reader in the case where the recording medium is a contact IC card. An RFID reader is used as the reader 17 in the case of a recording medium that uses radio frequency identification (RFID) as in a non-contact IC card, smartphone, or the like.

The camera 18 is provided at a predetermined position of the cart C, i.e., a position where the camera 18 is capable of imaging a shopping basket placed in a basket reception portion of the cart C. The camera 18 monitors that a customer who is a user of the cart C puts a to-be-purchased product into a shopping basket, or he/she takes out a to-be-purchased product from a shopping basket.

The speaker 19 is an example of an alarm that notifies, by emitting sound, the customer M1 who is a user of the cart C of information to be notified.

In the information terminal 10 that includes the circuit as described above, the processor 11, the main memory 12, the auxiliary storage device 13, the wireless unit 14, and the touch panel 15 are included in, for example, a tablet terminal TM. In the information terminal 10, the scanner 16, the reader 17, the camera 18, and the speaker 19 are electrically connected to the tablet terminal TM. Note that at least one of the scanner 16, the reader 17, the camera 18, or the speaker 19 may be included in the tablet terminal TM.

Figure 4:
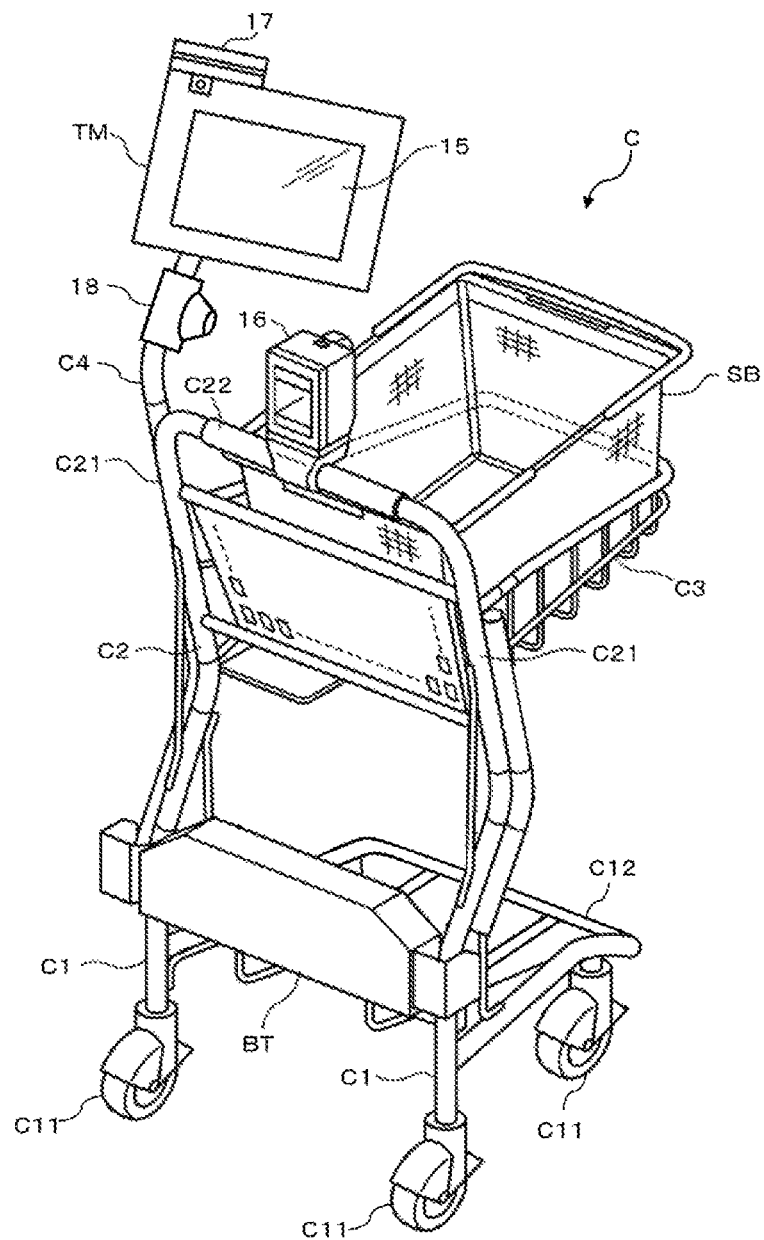
FIG. 4 is a perspective view illustrating an example of a cart including the information terminal according to the embodiment.

FIG. 4 illustrates an example of the cart C including the information terminal 10. As shown in FIG. 4, the cart C includes a caster portion C1 for movement, a handle frame portion C2, and a basket reception portion C3. The caster portion C1 includes four wheels C11 for smoothly moving on the floor. Further, the caster portion C1 includes a reception portion C12 on which a large luggage that does not fit in a shopping basket SB is placed. The handle frame portion C2 includes a pair of longitudinal frames C21, C21 erected on the rear wheel side of the caster portion C1, and a handle bar C22 that connects the upper ends of the longitudinal frames C21, C21 to each other. The basket reception portion C3 is provided so as to protrude forward from the middle portion of the handle frame portion C2. For example, the shopping basket SB provided in a store can be placed on the basket reception portion C3 of the cart C.

The shopping basket SB is a container that houses a product. Note that the container is not limited to the shopping basket SB. For example, the cart C is used without placing the shopping basket SB on the basket reception portion C3 in some cases. In this case, the basket reception portion C3 is a container.

As shown in FIG. 4, the scanner 16 is provided in the middle of the handle bar C22. Specifically, the scanner 16 is attached to the handle bar C22 such that a reading window 16A is located on the front side. The front side is a side where a customer who holds the handle bar C22 to push the cart C stands.

As shown in FIG. 4, a pole C4 is attached to one of the longitudinal frames C21, C21. The tip of the pole C4 is located above the handle bar C22. The tablet terminal TM is attached to the tip of the pole C4 with the screen of the touch panel 15 being directed on the front side. The reader 17 is attached to the frame of the tablet terminal TM such that the card slit is located on the front side. The reader 17 illustrated in FIG. 4 is, for example, a magnetic card reader. The camera 18 is attached in the middle of the pole C4 so as to image the entire shopping basket SB placed on the basket reception portion C3 from above.

As shown in FIG. 4, a battery BT is attached to the lower end of the handle frame portion C2 so as to extend over the longitudinal frames C21, C21. The battery BT is a drive power source of the tablet terminal TM, the scanner 16, the reader 17, the camera 18, and the speaker 19.

Figure 5:
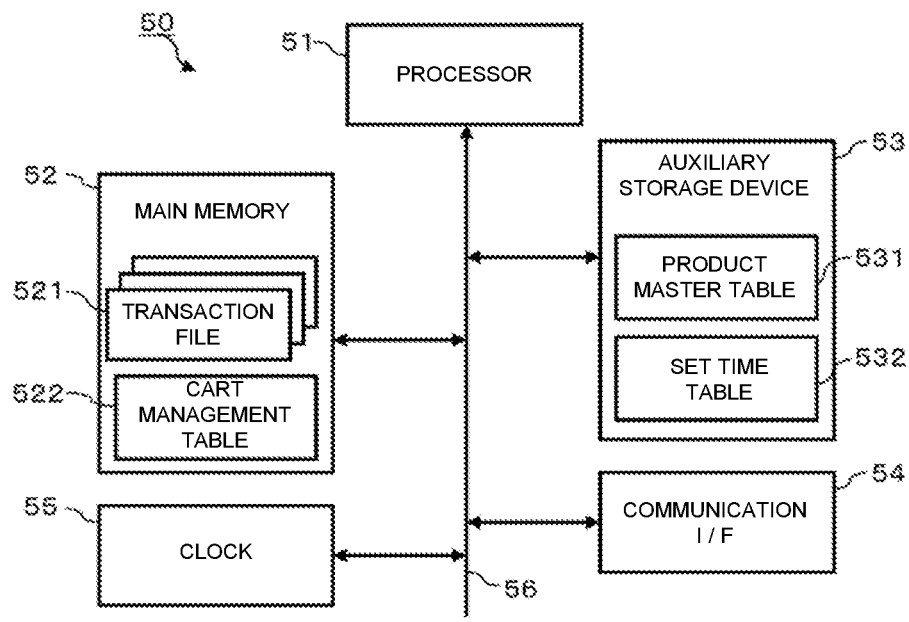
FIG. 5 is a block diagram illustrating a main circuit of a virtual POS server according to the embodiment.

FIG. 5 illustrates a main circuit of the virtual POS server 50. The virtual POS server 50 includes a processor 51, a main memory 52, an auxiliary storage device 53, a communication interface 54, a clock 55, and a system transmission path 56. The system transmission path 56 includes an address bus, a data bus, a control signal line, and the like. In the virtual POS server 50, the processor 51, the main memory 52, the auxiliary storage device 53, the communication interface 54, and the clock 55 are connected to the system transmission path 56. In the virtual POS server 50, the processor 51, the main memory 52, the auxiliary storage device 53, and the system transmission path 56 that connects them configure a computer.

The processor 51 corresponds to the central part of the computer. The processor 51 controls the respective units in accordance with an operating system or an application program to realize various functions as the virtual POS server 50. The processor 51 is, for example, a CPU.

The main memory 52 corresponds to the main storage part of the computer. The main memory 52 includes a non-volatile memory area and a volatile memory area. The main memory 52 stores, in the non-volatile memory area, an operating system or an application program. The main memory 52 stores, in the non-volatile memory or the volatile memory, data necessary for the processor 51 to execute processing for controlling the respective units in some cases. The volatile memory area of the main memory 52 is used also as a work area in which data is rewritten by the processor 51 as appropriate. The non-volatile memory area of the main memory 52 is, for example, a ROM. The volatile memory area of the main memory 52 is, for example, a RAM.

The auxiliary storage device 53 corresponds to an auxiliary storage part of the computer. The auxiliary storage device 53 includes, for example, an EEPROM, an HDD, an SSD, or the like. The auxiliary storage device 53 stores data to be used by the processor 51 to execute various types of processing, data generated by the processing by the processor 51, or the like. The auxiliary storage device 53 stores the above-mentioned application program in some cases.

The application program stored in the main memory 52 or the auxiliary storage device 53 includes a control program describing information processing to be executed by the virtual POS server 50. The method of installing the control program in the main memory 52 or the auxiliary storage device 53 is not particularly limited. The control program can be installed in the main memory 52 or the auxiliary storage device 53 by recording the control program on a removable recording medium or distributing the control program by communication via a network. The form of the recording medium is not limited as long as the recording medium is capable of storing a program, as in a CD-ROM, a memory card, or the like, and can be read by an apparatus.

The communication interface 54 is connected to the network 70. The communication interface 54 performs data communication with another device connected thereto via the network 70 in accordance with a communication protocol under the control of the processor 51.

The clock 55 measures the time and manages the date. The virtual POS server 50 handles the date and time measured by the clock 55 as the current date and time.

In the virtual POS server 50 having such a configuration, the auxiliary storage device 53 stores a product master table 531 and a set time table 532. FIG. 6 schematically illustrates a main data structure of the product master table 531. As shown in FIG. 6, the product master table 531 includes columns for a product code, a product name, a unit price, a product category, a refrigeration category, and a freezing category.

In the column for the product code, a unique code set for each product for individually identifying the products sold in a store is set. Note that each product is provided with, for example, a barcode or a two-dimensional data code as a code symbol of a code system including a product code. In the column for the product name, a unique name of the product identified by the corresponding product code is set. In the following description, the product identified by the corresponding product code will be referred to as the corresponding product. In the column for the unit price, the price per the corresponding product is set.

In the column for the product category, a name representing the classification to which the corresponding product belongs is set. Examples of the name of the classification include "confectionery", "dairy products", "frozen desserts", "leafy vegetables", "root vegetables", "fruit", "raw fish", "dry foods", "raw meat", "processed meat", and "microwave meals".

In the column for the refrigeration category, a value "1" is set for a product to be sold as a refrigerated food, of the corresponding products, and a value "0" is set for other products. For example, the value "1" is set, as the refrigeration category, for products classified by the classification names of "dairy products", "raw fish", "raw meat", and the like.

In the column for the freezing category, a value "1" is set for a product to be sold as a frozen food, of the corresponding products, and a value "0" is set for other products. For example, the value "1" is set, as the freezing category, for products classified by the classification names of "frozen desserts", "microwave meals", and the like.

Figure 7:
FIG. 7 is a schematic diagram illustrating a main data structure of a set time table according to the embodiment.

FIG. 7 schematically illustrates a main data structure of the set time table 532. As shown in FIG. 7, the set time table 532 includes columns for a time period, a refrigeration warning period, and a freezing warning period.

In the column for the time period, the start date and end date of each of a plurality of periods obtained by dividing one year are set, considering that the quality of a refrigerated food or a frozen food is affected by the temperature, humidity, and the like. In the column for the refrigeration warning period, periods T11, T12, T13, and T14 in which the quality of a refrigerated food will be expected to significantly deteriorate at room temperature for the corresponding time period are set. In the column for the freezing warning period, periods T21, T22, T23, and T24 in which the quality of a frozen food will be expected to significantly deteriorate at room temperature for the corresponding time period are set.

Note that in this embodiment, one year is divided into four periods, i.e., a first period from December 1 to March (winter), a second period from March 21 to June 10 (spring), a third period from June 11 to September 15 (summer), and a fourth period from September 16 to November (autumn). In winter, which is the first period, the temperature tends to be lower and the humidity tends to be lower than in other periods. For this reason, the period until the quality of a refrigerated food or frozen food placed at room temperature is affected is presumed to be relatively long. Therefore, the refrigeration warning period T11 and the freezing warning period T21 are set to be longer than other periods. Meanwhile, summer, which is the third period, tends to be hot and humid as compared with other periods. For this reason, the period until the quality of a refrigerated food or frozen food placed at room temperature is affected is presumed to be relatively short. Therefore, the refrigeration warning period T13 and the freezing warning period T23 are set to be shorter than other periods. Also regarding spring, which is the second period, and autumn, which is the fourth period, respectively, the appropriate refrigeration warning periods T12 and T14 and the appropriate freezing warning periods T22 and T24 are set considering the temperature, humidity, and the like.

Now, FIG. 5 will be described again. The virtual POS server 50 uses a part of the volatile memory area of the main memory 52 as an area of a transaction file 521 and an area of a cart management table 522. In the area of the transaction file 521, the transaction file 521 is created for each of the customers M1 who use the cart C to shop.

FIG. 8 schematically illustrates a main data structure of the transaction file 521. As shown in FIG. 8, the transaction file 521 is a data file having an area for storing a plurality of pieces of to-be-purchased-product data in association with the cart ID. The to-be-purchased-product data is data including a product code, a product name, a unit price, a quantity, an amount of money, a refrigeration category, a freezing category of the purchased product.

FIG. 9 schematically illustrates a main data structure of the cart management table 522. As shown in FIG. 9, the cart management table 522 includes columns for the cart ID, a refrigeration status, the refrigeration warning period, a refrigeration timer, a freezing status, the freezing warning period, and a freezing timer.

In the column for the cart ID, the cart ID set in the information terminal 10 provided in each of the carts C is set.

In the column for the refrigeration status, a value S1 that represents the state of a refrigerated food, of the products housed in the cart C including the information terminal 10 in which the cart ID has been set, is set. In the following description, the cart C including the information terminal 10 in which the cart ID has been set will be referred to as the cart Ca. Further, the value S1 will be referred to as the refrigeration status S1. In this embodiment, the state of the refrigerated food is indicated by four types of refrigeration status S1 of "0", "1", "2", and "3". The refrigeration status S1 of "0" represents the state where no refrigerated food is housed in the cart Ca. The refrigeration status S1 of "1" represents the state where a refrigerated food is housed in the cart Ca. The refrigeration status S1 of "2" represents the state where a period has elapsed since a refrigerated food was housed and the period has reached a refrigerating caution period. The refrigerating caution period is an arbitrary period shorter than the refrigeration warning period. For example, the refrigerating caution period is 50% of the refrigeration warning period. The refrigeration status S1 of "3" represents the state where a period has elapsed since a refrigerated food was housed and the period has reached the refrigeration warning period.

In the column for the refrigeration warning period, the refrigeration warning period T1$x$ of the period to which the current date belongs, of the refrigeration warning periods T11, T12, T13, and T14 for the respective time periods set in the set time table 532, is set.

In the column for the refrigeration timer, a timer counter for measuring an elapsed period since one refrigerated food was housed in the cart Ca is set. In the following description, this time counter will be referred to as the refrigeration timer T1.

In the column for the freezing status, a value S2 that represents the state of a frozen food, of the products housed in the cart Ca, is set. In the following description, the value S2 will be referred to as the freezing status S2. In this embodiment, the state of the frozen food is indicated by four types of freezing status S2 of "0", "1", "2", and "3". The freezing status S2 of "0" represents the state where no frozen food is housed in the cart Ca. The freezing status S2 of "1" represents the state where a frozen food is housed in the cart Ca. The freezing status S2 of "2" represents the state where a period has elapsed since a frozen food was housed in the cart Ca and the period has reached a freezing caution period. The freezing caution period is an arbitrary period shorter than the freezing warning period. For example, the freezing caution period is 60% of the freezing warning period. The freezing status S2 of "3" represents the state where a period has elapsed since a frozen food was housed in the cart Ca and the period has reached the freezing warning period.

In the column for the freezing warning period, a freezing warning period T2$x$ of the period to which the current date belongs, of the freezing warning periods T21, T22, T23, and T24 for the respective time periods set in the set time table 532, is set.

In the column for the freezing timer, a time counter for measuring an elapsed time since one frozen food was housed in the cart Ca is set. In the following description, this time counter will be referred to as the freezing timer T2.

Figure 10:
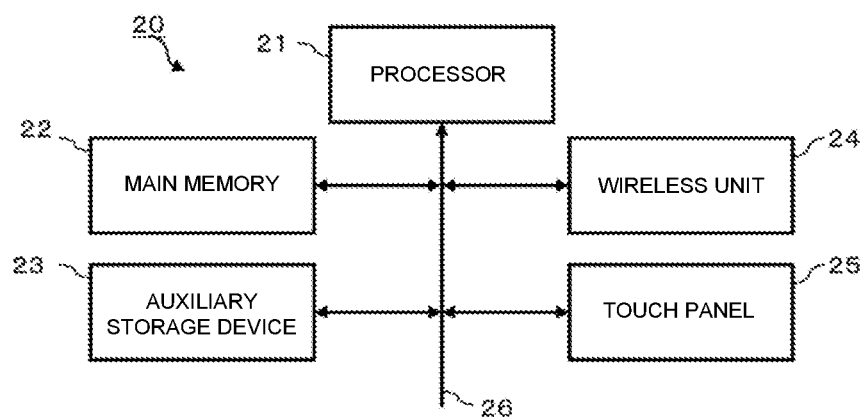
FIG. 10 is a block diagram illustrating a main circuit of a monitoring terminal according to the embodiment.

FIG. 10 illustrates a main circuit of the monitoring terminal 20. As shown in FIG. 10, the monitoring terminal 20 includes a processor 21, a main memory 22, an auxiliary storage device 23, a wireless unit 24, a touch panel 25, and a system transmission path 26. The system transmission path 26 includes an address bus, a data bus, a control signal line, and the like. In the monitoring terminal 20, the processor 21, the main memory 22, the auxiliary storage device 23, the wireless unit 24, and the touch panel 25 are connected to the system transmission path 26 directly or via a signal input/output circuit. In the monitoring terminal 20, the processor 21, the main memory 22, the auxiliary storage device 23, and the system transmission path 26 that connects them configure a computer.

The processor 21 corresponds to the central part of the computer. The processor 21 controls the respective units in accordance with an operating system or an application program to realize various functions as the monitoring terminal 20. The processor 21 is, for example, a CPU.

The main memory 22 corresponds to the main storage part of the computer. The main memory 22 includes a non-volatile memory area and a volatile memory area. The main memory 22 stores, in the non-volatile memory area, an operating system or an application program. The main memory 22 stores, in the volatile memory, data necessary for the processor 21 to execute processing for controlling the respective units. The data is stored in the non-volatile memory area of the main memory 22 in some cases. The volatile memory area of the main memory 22 is used also as a work area in which data is rewritten by the processor 21 as appropriate. The non-volatile memory area of the main memory 22 is, for example, a ROM. The volatile memory area of the main memory 22 is, for example, a RAM.

The auxiliary storage device 23 corresponds to an auxiliary storage part of the computer. The auxiliary storage device 23 includes, for example, an EEPROM, an HDD, an SSD, or the like. The auxiliary storage device 23 stores data to be used by the processor 21 to execute various types of processing, data generated by the processing by the processor 21, or the like. The auxiliary storage device 23 stores the above-mentioned application program in some cases.

The application program stored in the main memory 22 or the auxiliary storage device 23 includes a control program describing information processing to be executed by the monitoring terminal 20. The method of installing the control program in the main memory 22 or the auxiliary storage device 23 is not particularly limited. The control program can be installed in the main memory 22 or the auxiliary storage device 23 by recording the control program on a removable recording medium or distributing the control program by communication via a network. The form of the recording medium is not limited as long as the recording medium is capable of storing a program, as in a CD-ROM, a memory card, or the like, and can be read by an apparatus.

The wireless unit 24 wirelessly transmits/receives data to/from the access point 30 in accordance with a wireless communication protocol.

The touch panel 25 is a device that functions as both an input device and a display device of the monitoring terminal 20. The monitoring terminal 20 has a browser for displaying an image on the touch panel 25 on the basis of the image data generated by the virtual POS server 50.

FIG. 11 schematically illustrates an example of a tag image 251 displayed on the touch panel 25. The tag image 251 is created for each of the carts C. On the touch panel 25, the tag images 251 of the carts C operating in the product display area P are arranged in, for example, a matrix and displayed.

As shown in FIG. 11, the tag image 251 includes the cart ID, a refrigerated food housing period U1, a frozen food housing period U2, and a symbol. That is, the refrigerated food housing period U1, the frozen food housing period U2, and the symbol are displayed on the touch panel 25 as the tag image 251. The refrigerated food housing period U1 is an elapsed time since the first refrigerated food was housed in the cart C including the information terminal 10 in which the cart ID has been set. In the following description, the cart C including the information terminal 10 in which the cart ID has been set will be referred to as the cart Cb. The frozen food housing period U2 is an elapsed time since the first frozen food was housed in the cart Cb. The symbol includes, for example, "X", "O", "A", and "W". The symbol "X" represents that neither refrigerated food nor frozen food is housed in the cart Cb. The symbol "O" represents that a refrigerated food or frozen food is housed in the cart Cb. The symbol "A" represents that a period has elapsed since a refrigerated food or frozen food was housed in the cart Cb and the period has reached a caution period. The symbol "W" represents that a period has elapsed since a refrigerated food or frozen food was housed in the cart Cb and the period has reached a warning period.

Therefore, the attendant M2 can know that neither refrigerated food nor frozen food is housed in the cart Cb in the case where the symbol of the tag image 251 is "X". The attendant M2 can know that a refrigerated food or frozen food is housed in the cart Cb and know the housing period in the case where the symbol is "O". The attendant M2 can know that the refrigerated food housing period U1 or the frozen food housing period U2 has reached the refrigerating caution period or the freezing caution period in the case where the symbol is "A". The attendant M2 can know the refrigerated food housing period U1 or the frozen food housing period U2 has reached the refrigeration warning period or the freezing warning period in the case where the symbol is "W".

Figure 12:
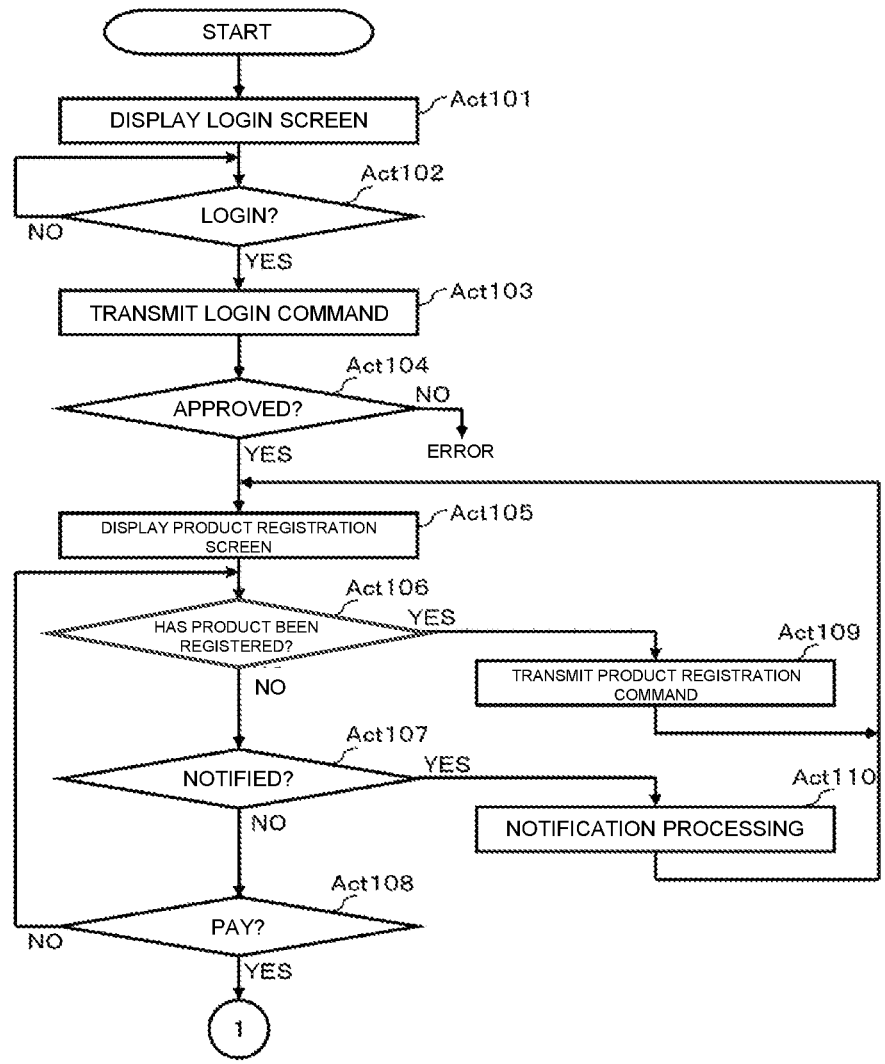
FIG. 12 is a flowchart illustrating main information processing executed by a processor of the information terminal according to the embodiment.
Figure 13:
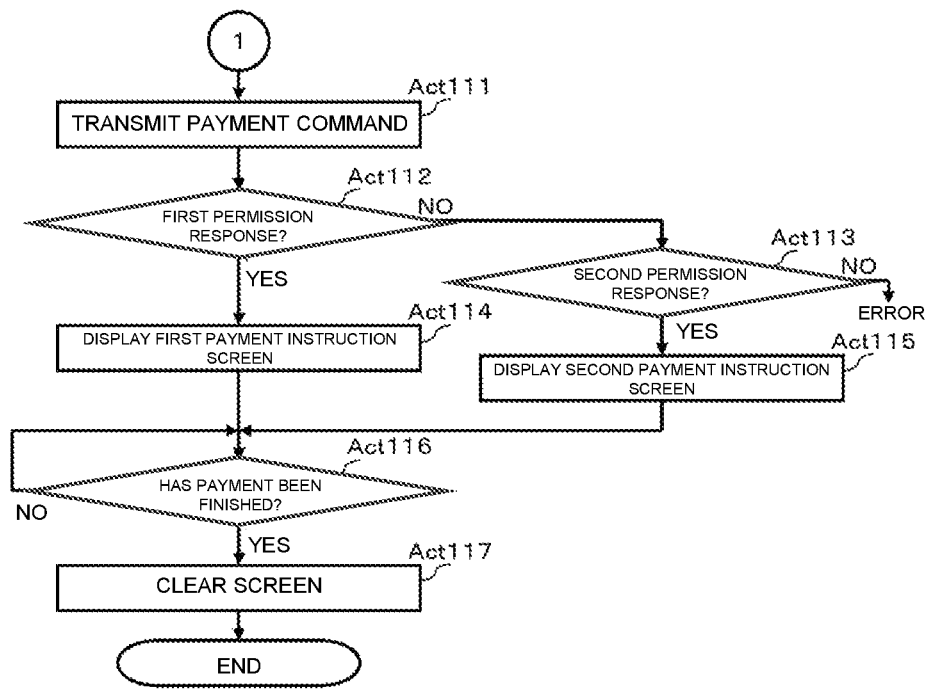
FIG. 13 is a flowchart illustrating the main information processing executed by the processor of the information terminal according to the embodiment.

FIG. 12 and FIG. 13 each illustrate a procedure of main information processing executed by the processor 11, which is a main body of the computer, of the information terminal 10 in accordance with the control program stored in the main memory 12 or the auxiliary storage device 13. FIG. 14 to FIG. 20 each illustrate a procedure of main information processing executed by the processor 51, which is a main body of the computer, of the virtual POS server 50 in accordance with the control program stored in the main memory 52 or the auxiliary storage device 53. FIG. 21 illustrates a procedure of main information processing executed by the processor 21, which is a main body of the computer, of the monitoring terminal 20 in accordance with the control program stored in the main memory 22 or the auxiliary storage device 23. Hereinafter, the main operation of the self-registration system 1 will be described with reference to these figures. Note that the operation described below is merely an example. The procedure of the operation described below is not particularly limited as long as similar results can be obtained.

First, the customer M1 who intends to register a to-be-purchased product by himself/herself using the information terminal 10 provided in the cart C touches the touch panel 15 of the information terminal 10. When he/she touches the touch panel 15, the processor 11 in the idle state is activated. The processor 11 starts information processing in the procedure shown in the flowcharts of FIG. 12 and FIG. 13.

As shown in FIG. 12, the processor 11 causes, in Act101, the touch panel 15 to display a login screen first. The login screen is a screen for instructing the customer M1 to perform a login operation. The customer M1 who has checked the login screen performs a login operation. For example, a customer causes the reader 17 to read the data of a login card as the login operation. The login card is, for example, a rewards card issued to a rewards member. The login card may be a login-only card lent from a store at the time of entry. Note that the login operation is not limited to reading a login card. For example, the customer M1 may input a login code via the touch panel 15 as the login operation.

When the data of the login card is read by the reader 17, the data is output to the processor 11. The processor 11 that has displayed the login screen stands by for a login operation in Act102. Upon acquiring the data of the login card, for example, the processor 11 determines that the login operation has been performed. In the case where it is determined that the login operation has been performed (YES in Act102), the processing of the processor 11 proceeds to Act103.

The processor 11 controls, in Act103, the wireless unit 14 to transmit a login command to the virtual POS server 50. With this control, the wireless unit 14 wirelessly transmits a login command to the access point 30. The login command is received by the access point 30 and transmitted to the virtual POS server 50 via the network 70. The login command includes the cart ID of the information terminal 10.

Meanwhile, upon receiving a command from the information terminal 10 via the communication interface 54, the processor of the virtual POS server 50 checks the type of the command. Then, in the case where the received command is a login command, the processor 51 starts the login processing shown in FIG. 14.

Figure 14:
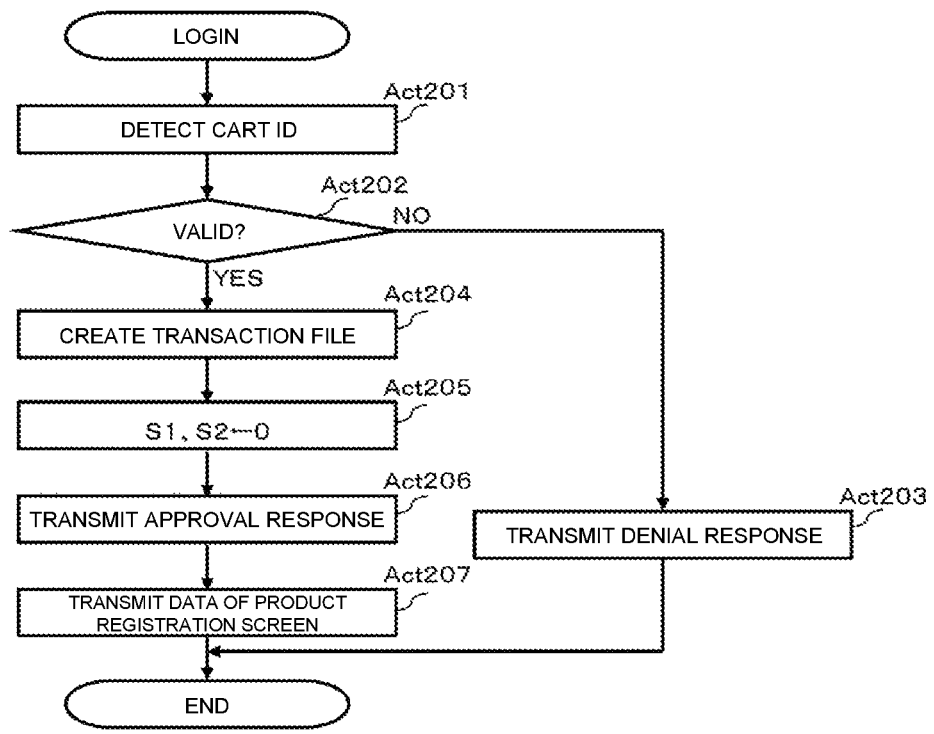
FIG. 14 is a flowchart illustrating login processing executed by a processor of the virtual POS server according to the embodiment.

As shown in FIG. 14, the processor 51 detects, in Act201, the cart ID from the login command. Then, the processor 51 determines, in Act202, whether or not the login is valid. For example, the processor 51 determines whether or not the transaction file 521 describing the cart ID is present in the main memory 52. In the case where the corresponding transaction file 521 is present in the main memory 52, the processor 51 determines that the login is invalid because a duplicate login operation has been erroneously performed by the information terminal 10 in which the corresponding cart ID has been set. In the case where the processor 51 determines that the login is invalid (NO in ACT202), the processing of the processor 51 proceeds to ACT203.

The processor 51 controls, in Act203, the communication interface 54 to transmit a denial response command to the information terminal 10. With this control, the communication interface 54 transmits a denial response command to the network 70. The denial response command is wirelessly transmitted from the access point 30 via the network 70 and received by the information terminal 10 that has transmitted the login command.

Meanwhile, in the case where the processor 51 determines that the login is valid, e.g., in the case where the processor 51 determines that the transaction file 521 describing the cart ID included in the login command is not present in the main memory 52 (YES in ACT202), the processing of the processor 51 proceeds to ACT204. The processor 51 creates, in Act204, a new transaction file 521 in the main memory 52. The processor 51 writes, to the transaction file 521, the cart ID included in the login command. Further, the processor 51 searches the cart management table 522 in ACT205. The processor 51 initializes both the refrigeration status S1 and the freezing status S2 corresponding to the cart ID included in the login command to "0".

The processor 51 controls, in Act206, the communication interface 54 to transmit an approval response command to the information terminal 10. Further, the processor 51 controls, in ACT207, the communication interface 54 to transmit data relating to a product registration screen to the information terminal 10. With such control, the communication interface 54 transmits the data of the approval response command and product registration screen to the network 70. Note that an example of the product registration screen will be described below. The data of the approval response command and product registration screen is wirelessly transmitted from the access point 30 via the network 70, and received by the information terminal 10 that has transmitted the login command.

Upon performing the control of transmitting a denial response command in ACT203 or the control of transmitting the data of the approval response command and product registration screen in ACT206 and ACT207, the processor 51 finishes the login processing shown in FIG. 14.

Now, FIG. 12 will be described again. The processor 11 (see Act103) of the information terminal 10, which has controlled the transmission of a login command, stands by for a response command from the virtual POS server 50 in Act104. In this standby state, upon receiving a denial response command from the virtual POS server 50 (NO in Act104), the processor 11 regards the above-mentioned login as an error.

Note that in the case where the login has been regarded as an error, the customer M1 who is an operator of the information terminal 10 performs an operation of cancelling the error via the touch panel 15. When the cancelling operation is performed, the processor 11 restarts the processing from Act101. Therefore, a customer needs to log in again.

In the case where the processor 11 determines that an approval response command has been received from the virtual POS server 50 (YES in Act104), the processing of the processor 11 proceeds to Act105. The processor 11 causes, in Act105, the touch panel 15 to display a product registration screen SL1 (see FIG. 22) on the basis of the data of the product registration screen, which has been received together with the above-mentioned approval response command.

Figure 22:
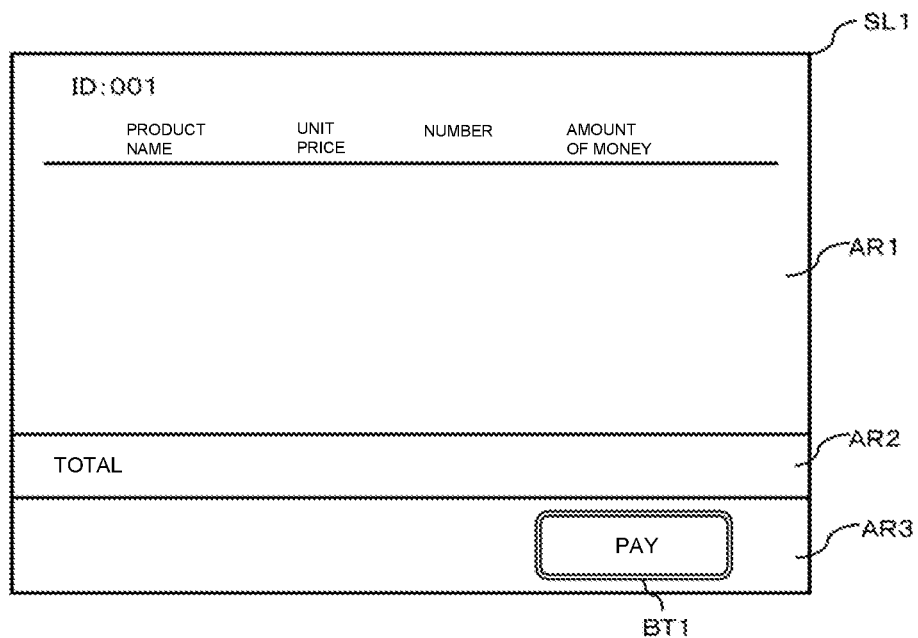
FIG. 22 is a schematic diagram illustrating an example of a product registration screen displayed on a touch panel of the information terminal according to the embodiment.

FIG. 22 schematically illustrates an example of the product registration screen SL1. As shown in FIG. 22, areas AR1, AR2, and AR3 are formed in the product registration screen SL1. The area AR1 is an area for displaying a product name, a unit price, the number of sales, and a sales price of a to-be-purchased product in a list format. The area AR2 is an area for displaying the total number of to-be-purchased products, the total amount of money, and the like. The area AR3 is an area including a button image. In the area AR3 shown in FIG. 22, an image of a payment button BT1 is displayed. The payment button BT1 is an operator to be touch-operated when a customer instructs payment. Further, also the cart ID stored in the main memory 12 is displayed on the upper part of the product registration screen SL1.

After checking the product registration screen SL1, the customer M1 goes around the sales floor and houses a product to be purchased, i.e., a so-called to-be-purchased product, in the cart C. For example, the customer M1 puts a to-be-purchased product in the shopping basket SB placed on the basket reception portion C3. Before putting a to-be-purchased product in the shopping basket SB, the customer M1 operates the scanner 16 to causes it to read the code symbol attached to the product. When the code symbol is read by the scanner 16, the product code included in the code symbol is input to the information terminal 10. Specifically, the product identified by the product code is registered.

Note that no code symbol is attached to some products such as fresh foods in some cases. In the case where no code symbol is attached to a to-be-purchased product, a customer selects and touches a product button corresponding to the to-be-purchased product from product buttons displayed on the touch panel 15. When the product button is touched, the product code of the product corresponding to the product button is input to the information terminal 10. Specifically, the product identified by the product code is registered.

The processor 11 determines, in Act106, whether or not a product has been registered. In the case where the processor determines that no product has been registered (NO in Act106), the processing of the processor 11 proceeds to Act107. The processor 11 determines, in Act107, whether or not a notification command has been received from the virtual POS server 50. The notification command will be described below. In the case where the processor 11 determines that no notification command has been received (NO in Act107), the processing of the processor 11 proceeds to Act108. The processor 11 determines, in Act108, whether or not payment has been instructed.

The customer who has completed the shopping touches the payment button BT1 of the product registration screen SL1. Upon detecting that the payment button BT1 has been touched, the processor 11 determines that payment has been instructed. In the case where the processor 11 determines that no payment has been instructed (NO in Act108), the processing of the processor 11 returns to Act106. Then, the processor 11 stands by until a product is registered, a notification command is received, and payment is instructed, respectively, in Act106 to Act108.

In this standby state, in the case where the processor determines that a product has been registered (YES in Act106), the processing of the processor 11 proceeds to Act109. The processor 11 controls, in Act109, the wireless unit 14 to transmit a product registration command to the virtual POS server 50. With this control, the wireless unit 14 wirelessly transmits a product registration command to the access point 30. The product registration command is received by the access point 30 and transmitted to the virtual POS server 50 via the network 70. The product registration command includes the cart ID and the product code of the registered product.

Figure 15:
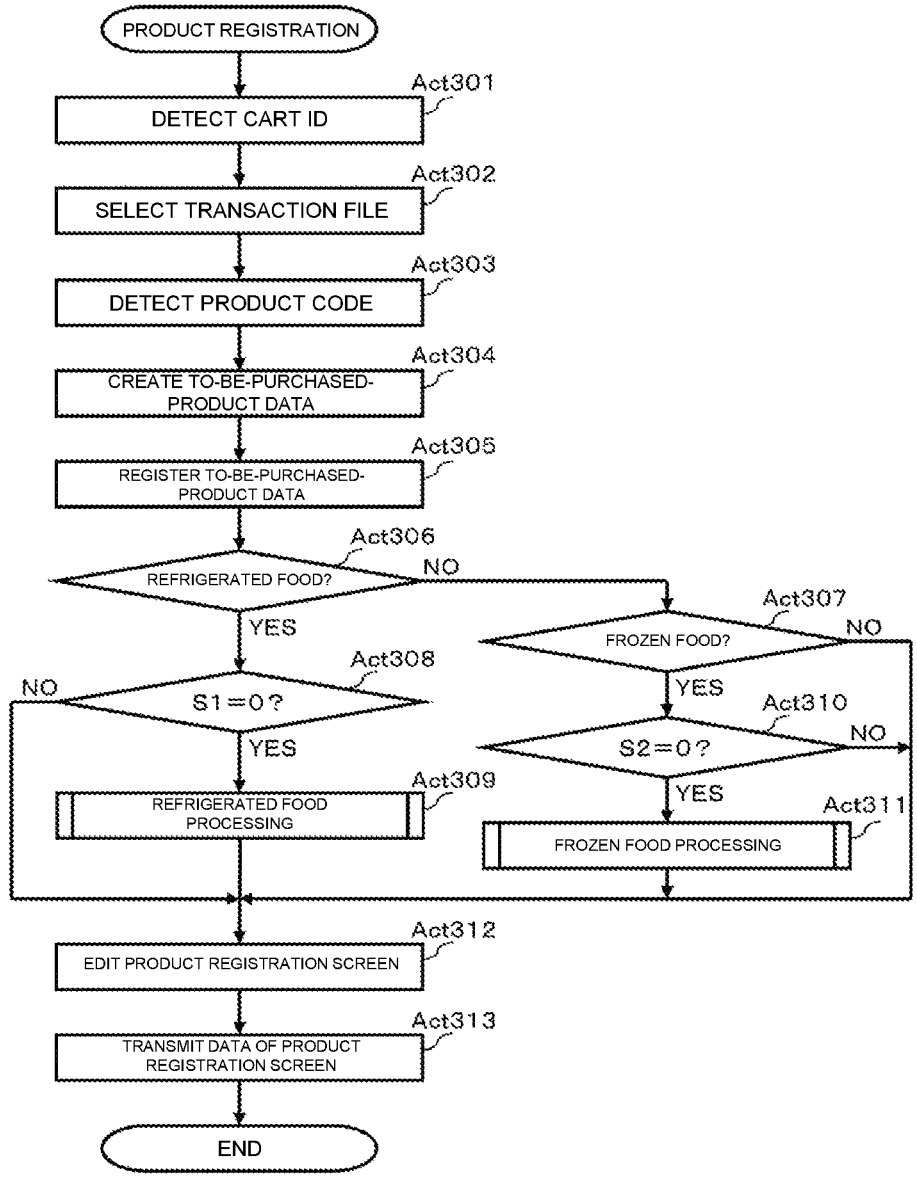
FIG. 15 is a flowchart illustrating product registration processing executed by the processor of the virtual POS server according to the embodiment.
Figure 16:
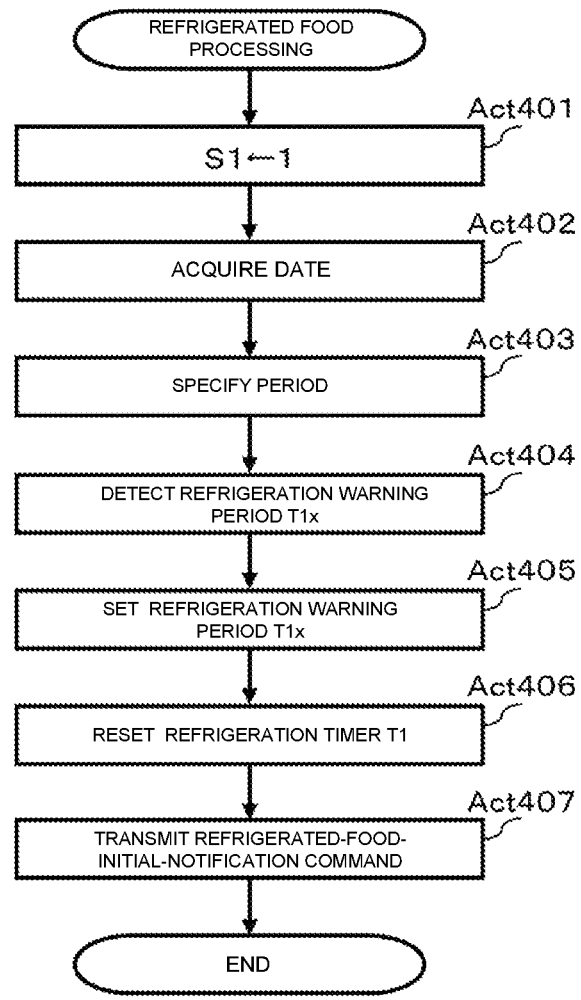
FIG. 16 is a flowchart illustrating refrigerated food processing executed by the processor of the virtual POS server according to the embodiment.
Figure 17:
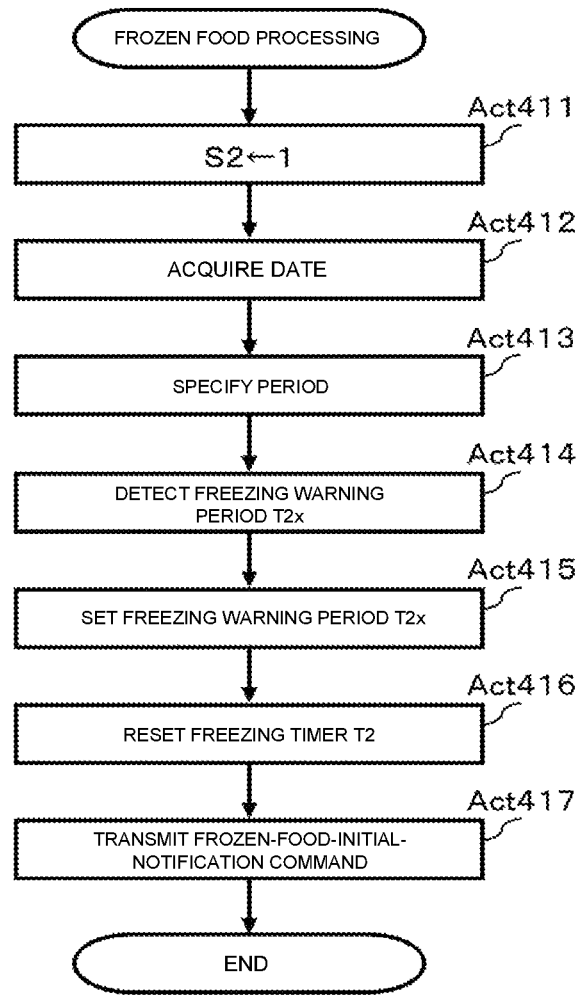
FIG. 17 is a flowchart illustrating frozen food processing executed by the processor of the virtual POS server according to the embodiment.

The processor 51 of the virtual POS server 50 starts, in the case where the received command is a product registration command, the product registration processing in the procedure shown in the flowcharts of FIG. 15 to FIG. 17.

As shown in FIG. 15, the processor 51 detects, in Act301, the cart ID from the product registration command. The processor 51 selects, in Act302, the transaction file 521 describing the above-mentioned cart ID as a registration processing target. In the following description, the transaction file 521 to be registered will be referred to simply as the transaction file 521A.

The processor 51 detects, in ACT303, a product code from the product registration command. The processor 51 creates, in ACT304, to-be-purchased-product data on the basis of the above-mentioned product code. Specifically, the processor 51 searches the product master table 531 using the above-mentioned product code. The processor 51 acquires, on the basis of the search result, the product name, the unit price, the product category, the refrigeration category, and the freezing category associated with the product code. The processor 51 creates to-be-purchased-product data on the basis of the above-mentioned product code, product name, unit price, quantity, amount of money, refrigeration category, and freezing category. Note that the quantity is "1". The amount of money is an amount of money obtained by multiplying the unit price by the quantity. The processor 51 registers, in ACT305, the above-mentioned to-be-purchased-product data in the transaction file 521A.

Upon completing the registration of the to-be-purchased-product data, the processor 51 determines, in ACT306, whether or not the to-be-purchased product specified by the above-mentioned product code is a refrigerated food, on the basis of the refrigeration category. In the case where the refrigeration category is "1", the to-be-purchased product is a refrigerated food. In the case where the refrigeration category is "0", the to-be-purchased product is not a refrigerated food. In the case where the processor 51 determines that the to-be-purchased product is not a refrigerated food (NO in ACT306), the processing of the processor 51 proceeds to ACT307.

The processor 51 determines, in ACT307, whether or not the to-be-purchased product specified by the above-mentioned product code is a frozen food, on the basis of the freezing category. In the case where the freezing category is "1", the to-be-purchased product is a frozen food. In the case where the freezing category is "0", the to-be-purchased product is not a frozen food. In the case where the processor 51 determines that the to-be-purchased product is not a frozen food (NO in ACT307), the processing of the processor 51 proceeds to ACT312.

Meanwhile, in the case where the processor 51 determines that the to-be-purchased product is a refrigerated food (YES in ACT306), the processing of the processor 51 proceeds to ACT308. The processor 51 searches, in ACT308, the cart management table 522 using the cart ID detected from the product registration command. The processor 51 determines whether or not the refrigeration status S1 corresponding to the cart ID is "0". In the case where the processor 51 determines that the refrigeration status S1 is not "0" (NO in ACT308), the processing of the processor 51 proceeds to ACT312. Note that the case where the refrigeration status S1 is not "0" represents the case where a refrigerated food has already been registered as a to-be-purchased product.

In the case where the processor 51 determines that the refrigeration status S1 is "0", i.e., the processor 51 determines that the first refrigerated food has been registered (YES in ACT308), the processing of the processor proceeds to ACT309. The processor 51 executes refrigerated food processing in ACT309.

FIG. 16 specifically illustrates the procedure of refrigerated food processing. As shown in FIG. 16, upon starting refrigerated food processing, the processor 51 updates, in ACT401, the refrigeration status S1 to "1" first. Further, the processor 51 acquires, in ACT402, the current date from the clock 55. The processor 51 specifies, in ACT403, the time period including the current date with reference to the set time table 532.

After specifying the above-mentioned time period, the processor 51 detects, in ACT404, the refrigeration warning period T1$x$ corresponding to the above-mentioned specified period from the set time table 532. The processor 51 sets, in ACT405, the above-mentioned refrigeration warning period T1$x$ as the refrigeration warning period associated with the cart ID of the cart management table 522. Further, the processor 51 resets, in ACT406, the refrigeration timer T1 associated with the cart ID of the cart management table 522. Further, the processor 51 controls, in ACT407, the communication interface 54 to transmit a refrigerated-food-initial-notification command to the information terminal 10 that has transmitted the product registration command and to the monitoring terminal 20. With this control, the communication interface 54 transmits a refrigerated-food-initial-notification command to the network 70. The refrigerated-food-initial-notification command is wirelessly transmitted from the access point 30 via the network 70 and received by the information terminal 10 that has transmitted the product registration command and by the monitoring terminal 20. Note that the refrigerated-food-initial-notification command includes the cart ID set in the information terminal 10, which is the transmission destination.

The operations of the information terminal 10 and the monitoring terminal 20 that have received the refrigerated-food-initial-notification command will be described below. Upon controlling the transmission of the refrigerated-food-initial-notification command, the processor 51 finishes the refrigerated food processing shown in FIG. 16. The processing of the processor 51 proceeds to ACT312 shown in FIG. 15.

Meanwhile, in the case where the processor 51 determines that the to-be-purchased product is a frozen food, (YES in ACT307), the processing of the processor 51 proceeds to ACT310. The processor 51 searches, in ACT310, the cart management table 522 using the cart ID detected from the product registration command. The processor 51 determines whether or not the freezing status S2 corresponding to the cart ID is "0". In the case where the processor 51 determines that the freezing status S2 is not "0" (NO in ACT310), the processing of the processor 51 proceeds to ACT312. Note that the case where the freezing status S2 is not "0" represents the case where a frozen food has already been registered as a to-be-purchased product.

Further, in the case where the processor 51 determines that the freezing status S2 is "0", i.e., in the case where the processor 51 determines that the first frozen food has been registered (YES in ACT310), the processing of the processor 51 proceeds to ACT311. The processor 51 executes frozen food processing in ACT311.

FIG. 17 specifically illustrates the procedure of the frozen food processing. As shown in FIG. 17, upon starting the frozen food processing, the processor 51 updates, in ACT411, the freezing status S2 to "1" first. Further, the processor 51 acquires, in ACT412, the current date from the clock 55. The processor 51 specifies, in ACT413, the time period including the current date with reference to the set time table 532.

After specifying the above-mentioned time period, the processor 51 detects, in ACT414, the freezing warning period T2x corresponding to the above-mentioned specified time period from the set time table 532. The processor 51 sets, in ACT415, the freezing warning period T2x as the freezing warning period associated with the cart ID of the cart management table 522. Further, the processor 51 resets, in ACT416, the freezing timer T2 associated with the cart ID of the cart management table 522. Further, the processor 51 controls, in ACT417, the communication interface 54 to transmit a frozen-food-initial-notification command to the information terminal 10 that has transmitted the product registration command and to the monitoring terminal 20. With this control, the communication interface 54 transmits a frozen-food-initial-notification command to the network 70. The frozen-food-initial-notification command is wirelessly transmitted from the access point 30 via the network 70 and received by the information terminal 10 that has transmitted the product registration command and by the monitoring terminal 20. Note that the frozen-food-initial-notification command includes the cart ID set in the information terminal 10, which is the transmission destination.

The operations of the information terminal 10 and the monitoring terminal 20 that have received the frozen-food-initial-notification command will be described below. Upon controlling the transmission of the frozen-food-initial-notification command, the processor 51 finishes the frozen food processing shown in FIG. 17. The processing of the processor 51 proceeds to ACT312 shown in FIG. 15.

As described above, in the case where the to-be-purchased product is the first refrigerated food, the processor 51 executes the refrigerated food processing and then, the processing of the processor 51 proceeds to ACT312. Further, in the case where the to-be-purchased product is the second or subsequent refrigerated food or frozen food, or another product, the refrigerated food processing or frozen food processing is not performed and the processing of the processor 51 proceeds to ACT312.

The processor 51 edits, in ACT312, the data of the product registration screen so that the product name, the unit price, the number of sales, the sales price, and the like of the to-be-purchased-product data registered in the transaction file 521A are displayed on the product registration screen. At this time, the processor 51 edits the data of the product registration screen so that a refrigeration mark [Refrigerated] is added to the product having the refrigeration category of "1". Similarly, the processor 51 edits the data of the product registration screen so that a freezing mark [Frozen] is added to the product having the freezing category of "1". The processor controls, in ACT313, the communication interface 54 to transmit the data of the product registration screen to the information terminal 10. With this control, the communication interface 54 transmits the data of the product registration screen to the network 70. The data of the product registration screen is wirelessly transmitted from the access point 30 via the network 70 and received by the information terminal 10 that has transmitted the product registration command.

Upon controlling the transmission of the data of the product registration screen in ACT313, the processor 51 finishes the product registration processing shown in FIG. 15.

Now, FIG. 12 will be described again. The processing of the processor 11 of the information terminal 10, which has controlled the transmission of the product registration command (see Act109), returns to Act105. Specifically, the processor 11 updates the product registration screen SL1 displayed on the touch panel 15 on the basis of the data of the product registration screen received from the virtual POS server 50. With this update, the product name, the unit price, the number of sales, and the sales price of the registered to-be-purchased product are displayed in the area AR1 of the product registration screen SL1. In the case where the to-be-purchased product is a refrigerated food, also a refrigeration mark [Refrigerated] is displayed. In the case where the to-be-purchased product is a frozen food, also a freezing mark [Frozen] is displayed. The total number and the total amount of money of the registered to-be-purchased product are displayed in the area AR2.

Figure 18:
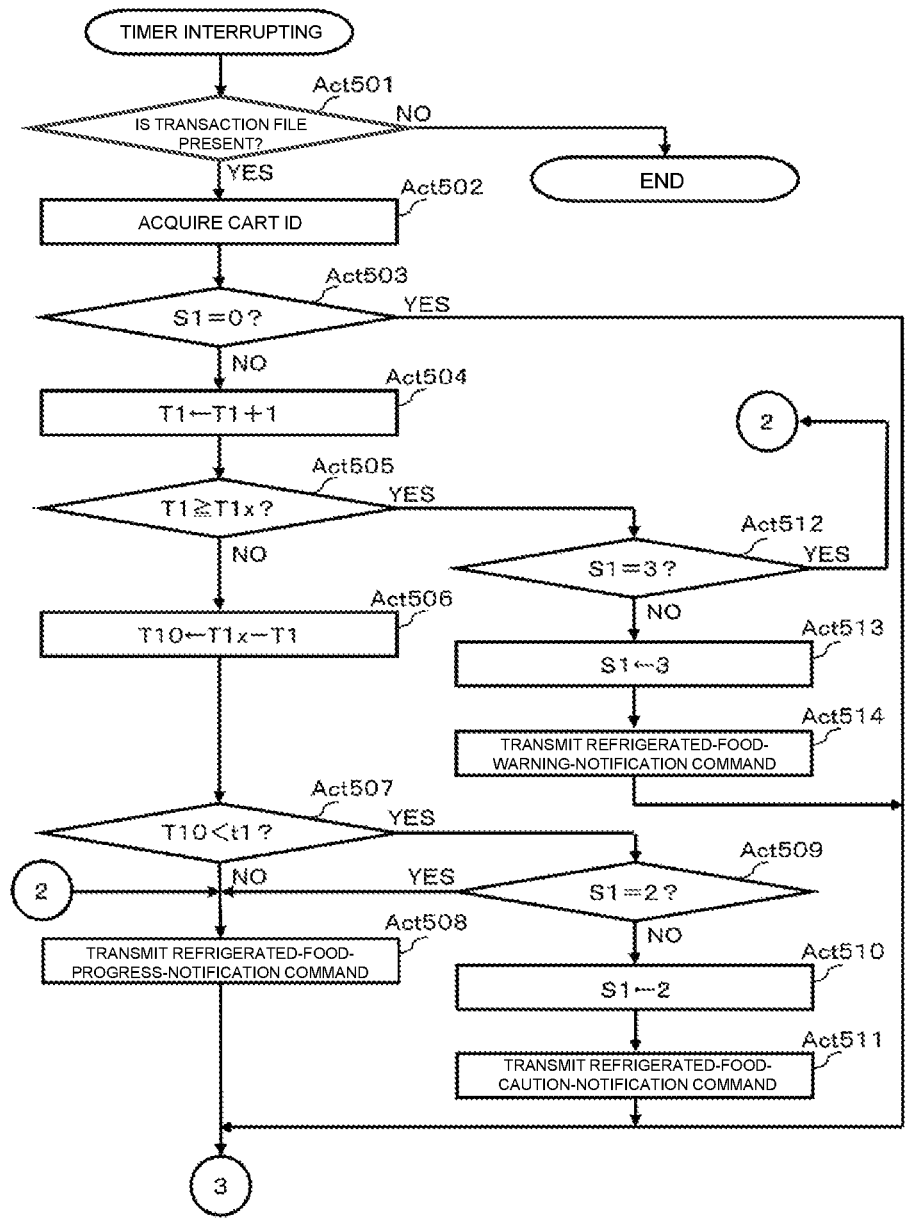
FIG. 18 is a flowchart illustrating timer interrupting processing executed by the processor of the virtual POS server according to the embodiment.
Figure 19:
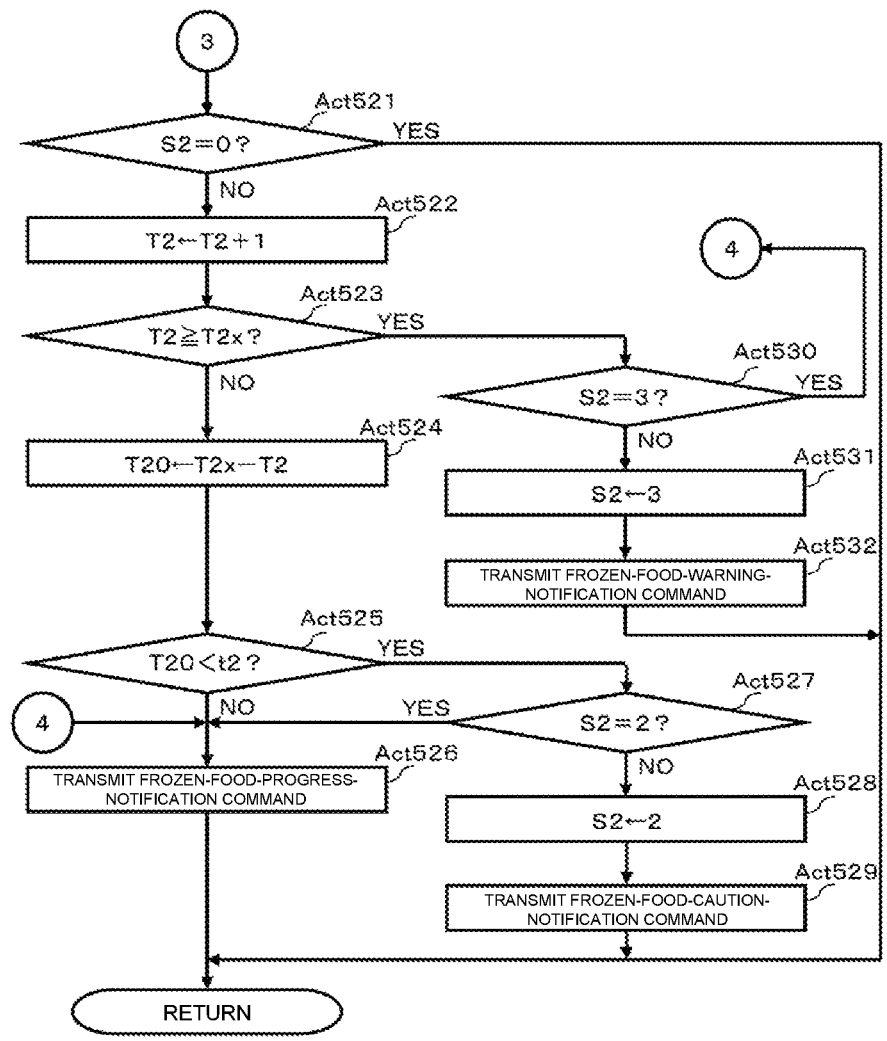
FIG. 19 is a flowchart illustrating the timer interrupting processing executed by the processor of the virtual POS server according to the embodiment.

Now, timer interrupting processing executed by the processor 51 of the virtual POS server 50 will be described. FIG. 18 and FIG. 19 each illustrate the procedure of the timer interrupting processing. Each time the clock 55 measures, for example, one second, the processor 51 starts the processing in the procedure shown in FIG. 18 and FIG. 19.

As shown in FIG. 18, the processor 51 determines, in ACT501, whether or not the transaction file 521 that has not been processed in the interrupting processing is present in a predetermined area of the main memory 52. In the case where the processor 51 determines that the transaction file 521 that has not been processed is present (YES in ACT501), the processing of the processor 51 proceeds to ACT502. The processor 51 acquires, in ACT502, the cart ID from the above-mentioned transaction file 521 that has not been processed. In the following processing, the cart ID thus acquired will be referred to as the target cart ID.

The processor 51 determines, in ACT503, whether or not the refrigeration status S1 associated with the target cart ID is "0" with reference to the cart management table 522. In the case where the refrigeration status S1 is "0", the customer who uses the cart C identified by the target cart ID has not yet purchased a refrigerated food. In the case where the processor 51 determines that the refrigeration status S1 is "0" (YES in ACT503), the processing of the processor 51 proceeds to ACT521 shown in FIG. 19.

In the case where the refrigeration status S1 is not "0", the customer using the cart C identified by the target cart ID purchases a refrigerated food. In the case where the processor 51 determines that the refrigeration status S1 is not "0" (NO in ACT503), the processing of the processor 51 proceeds to ACT504. The processor 51 increments, in ACT504, the refrigeration timer T1 corresponding to the target cart ID of the cart management table 522 by "1".

The processor 51 determines, in ACT505, whether or not the incremented refrigeration timer T1 has reached the refrigeration warning period T1x corresponding to the target cart ID. In the case where the processor 51 determines that the refrigeration timer T1 has not reached the refrigeration warning period T1x (NO in ACT505), the processing of the processor 51 proceeds to ACT506. The processor 51 calculates, in ACT506, a remaining time T10 until the refrigeration warning period T1x by subtracting the time period of the refrigeration timer T1 from the refrigeration warning period T1x. The processor 51 determines, in ACT507, whether or not the remaining time T10 is less than a refrigerating caution period t1. The refrigerating caution period t1 is, for example, 50% of the refrigeration warning period T1x. That is, in the case where the refrigeration warning period T1x is minutes, the refrigerating caution period t1 is five minutes.

In the case where the processor 51 determines that the remaining time T10 is the refrigerating caution period t1 or more (NO in ACT507), the processing of the processor 51 proceeds to ACT508. The processor 51 controls, in ACT508, the communication interface 54 to transmit a refrigerated-food-progress-notification command to the information terminal 10 in which the target cart ID has been set and to the monitoring terminal 20. With this control, the communication interface 54 transmits the refrigerated-food-progress-notification command to the network 70. The refrigerated-food-progress-notification command includes a count value of the refrigeration timer T1 together with the cart ID. The refrigerated-food-progress-notification command is wirelessly transmitted from the access point 30 via the network 70 and received by the information terminal 10 in which the target cart ID has been set and by the monitoring terminal 20.

The operations of the information terminal 10 and the monitoring terminal 20 that have received the refrigerated-food-progress-notification command will be described below. In the case where the processor 51 has controlled the transmission of the refrigerated-food-progress-notification command, the processing of the processor 51 proceeds to ACT521 shown in FIG. 19.

In the case where the processor 51 determines that the remaining time T10 is less than the refrigerating caution period t1 (YES in ACT507), the processing of the processor 51 proceeds to ACT509. The processor 51 determines, in ACT509, whether or not the refrigeration status S1 corresponding to the target cart ID is "2". In the case where the processor 51 determines that the refrigeration status S1 is not "2" (NO in ACT509), the processing of the processor 51 proceeds to ACT510. The processor 51 sets, in ACT510, the refrigeration status S1 to "2". The processor 51 controls, in ACT511, the communication interface 54 to transmit a refrigerated-food-caution-notification command to the information terminal 10 in which the target cart ID has been set and to the monitoring terminal 20. The refrigerated-food-caution-notification command includes a count value of the refrigeration timer T1 together with the cart ID. With this control, the communication interface 54 transmits the refrigerated-food-caution-notification command to the network 70. The refrigerated-food-caution-notification command is wirelessly transmitted from the access point 30 via the network 70 and received by the information terminal 10 in which the target cart ID has been set and by the monitoring terminal 20.

The operations of the information terminal 10 and the monitoring terminal 20 that have received the refrigerated-food-caution-notification command will be described below. In the case where the processor 51 controls the transmission of the refrigerated-food-caution-notification command, the processing of the processor 51 proceeds to ACT521 shown in FIG. 19.

In the case where the refrigeration status S1 is "2" in ACT509, the refrigerated-food-caution-notification command has already been transmitted. In the case where the processor 51 determines that the refrigeration status S1 is "2" (YES in ACT509), the processing of the processor 51 proceeds to ACT508. The processor 51 controls, in ACT508, the communication interface 54 to transmit the refrigerated-food-progress-notification command to the information terminal 10 in which the target cart ID has been set and to the monitoring terminal 20. Then, the processing of the processor 51 proceeds to ACT521 shown in FIG. 19.

Meanwhile, in the case where the processor 51 determines that the refrigeration timer T1 has reached the refrigeration warning period T1x (YES in ACT505), the processing of the processor 51 proceeds to ACT512. The processor 51 determines, in ACT512, whether or not the refrigeration status S1 corresponding to the target cart ID is "3". In the case where the processor 51 determines that the refrigeration status S1 is not "3" (NO in ACT512), the processing of the processor 51 proceeds to ACT513. The processor 51 sets, in ACT513, the refrigeration status S1 to "3". The processor 51 controls, in ACT514, the communication interface 54 to transmit a refrigerated-food-warning-notification command to the information terminal 10 in which the target cart ID has been set and to the monitoring terminal 20. With this control, the communication interface 54 transmits the refrigerated-food-warning-notification command to the network 70. The refrigerated-food-warning-notification command includes a counter value of the refrigeration timer T1 together with the cart ID. The refrigerated-food-warning-notification command is wirelessly transmitted from the access point 30 via the network 70 and received by the information terminal 10 in which the target cart ID has been set and by the monitoring terminal 20.

The operations of the information terminal 10 and the monitoring terminal 20 that have received the refrigerated-food-warning-notification command will be described below. In the case where the processor 51 has controlled the transmission of the refrigerated-food-warning-notification command, the processing of the processor 51 proceeds to ACT521 shown in FIG. 19.

In the case where the refrigeration status S1 is "3" in ACT512, the refrigerated-food-warning-notification command has already been transmitted. In the case where the processor 51 determines that the refrigeration status S1 is "3" (YES in ACT512), the processing of the processor 51 proceeds to ACT508. The processor 51 controls, in ACT508, the communication interface 54 to transmit the refrigerated-food-progress-notification command to the information terminal 10 in which the target cart ID has been set and to the monitoring terminal 20. Then, the processing of the processor 51 proceeds to ACT521 shown in FIG. 19.

In ACT521, the processor 51 determines whether or not the freezing status S2 associated with the target cart ID is "0" with reference to the cart management table 522. In the case where the freezing status S2 is "0", the customer using the cart C identified by the target cart ID has not yet purchased a frozen food. In the case where the processor 51 determines that the freezing status S2 is "0" (YES in ACT521), the processing of the processor 51 returns to ACT501 shown in FIG. 18.

In the case where the freezing status S2 is not "0", the customer using the cart C identified by the target cart ID purchases a frozen food. In the case where the processor 51 determines that the freezing status S2 is not "0" (NO in ACT521), the processing of the processor 51 proceeds to ACT522. The processor 51 increments, in ACT522, the freezing timer T2 corresponding to the target cart ID of the cart management table 522 by "1".

The processor 51 determines, in ACT523, whether or not the incremented freezing timer T2 has reached the freezing warning period T2x corresponding to the target cart ID. In the case where the processor 51 determines that the freezing timer T2 has not reached the freezing warning period T2x (NO in ACT523), the processing of the processor 51 proceeds to ACT524. The processor 51 calculates, in ACT524, a remaining time T20 until the freezing warning period T2x by subtracting the time period of the freezing timer T2 from the freezing warning period T2x. The processor 51 determines, in ACT525, whether or not the remaining time T20 is less than a freezing caution period t2. The freezing caution period t2 is, for example, 60% of the freezing warning period T2x. That is, in the case where the freezing warning period T2x is 10 minutes, the freezing caution period t2 is six minutes.

In the case where the processor 51 determines that the remaining time T20 is the freezing caution period t2 or more (NO in ACT525), the processing of the processor 51 proceeds to ACT526. The processor 51 controls, in ACT526, the communication interface 54 to transmit a frozen-food-progress-notification command to the information terminal 10 in which the target cart ID has been set and to the monitoring terminal 20. With this control, the communication interface 54 transmits the frozen-food-progress-notification command to the network 70. The frozen-food-progress-notification command includes a count value of the freezing timer T2 together with the cart ID. The frozen-food-progress-notification command is wirelessly transmitted from the access point 30 via the network 70 and received by the information terminal 10 in which the target cart ID has been set and by the monitoring terminal 20.

The operations of the information terminal 10 and the monitoring terminal 20 that have received the frozen-food-progress-notification command will be described below. In the case where the processor 51 has controlled the transmission of the frozen-food-progress-notification command, the processing of the processor 51 returns to ACT501 shown in FIG. 18.

In the case where the processor 51 determines that the remaining time T20 is less than the freezing caution period t2 (YES in ACT525), the processing of the processor 51 proceeds to ACT527. The processor 51 determines, in ACT527, whether or not the freezing status S2 corresponding to the target cart ID is "2". In the case where the processor 51 determines that the freezing status S2 is not "2" (NO in ACT527), the processing of the processor 51 proceeds to ACT528. The processor 51 sets, in ACT528, the freezing status S2 to "2". The processor 51 controls, in ACT529, the communication interface 54 to transmit a frozen-food-caution-notification command to the information terminal 10 in which the target cart ID has been set and to the monitoring terminal 20. With this control, the communication interface 54 transmits the frozen-food-caution-notification command to the network 70. The frozen-food-caution-notification command includes a count value of the freezing timer T2 together with the cart ID. The frozen-food-caution-notification command is wirelessly transmitted from the access point 30 via the network 70 and received by the information terminal 10 in which the target cart ID has been set and by the monitoring terminal 20.

The operations of the information terminal 10 and the monitoring terminal 20 that have received the frozen-food-caution-notification command will be described below. In the case where the processor 51 has controlled the transmission of the frozen-food-caution-notification command, the processing of the processor 51 returns to ACT501 shown in FIG. 18.

In the case where the freezing status S2 is "2" in ACT527, the frozen-food-caution-notification command has already been transmitted. In the case where the processor 51 determines that the freezing status S2 is "2" (YES in ACT527), the processing of the processor 51 proceeds to ACT526. The processor 51 controls, in ACT526, the communication interface 54 to transmit the frozen-food-progress-notification command to the information terminal 10 in which the target cart ID has been set and to the monitoring terminal 20. Then, the processing of the processor 51 returns to ACT501 shown in FIG. 18.

Meanwhile, in the case where the processor 51 determines that the freezing timer T2 has reached the freezing warning period T2x (YES in ACT523), the processing of the processor proceeds to ACT530. The processor 51 determines, in ACT530, whether or not the freezing status S2 corresponding to the target cart ID is "3". In the case where the processor 51 determines that the freezing status S2 is not "3" (NO in ACT530), the processing of the processor 51 proceeds to ACT531. The processor 51 sets, in ACT531, the freezing status S2 to "3". The processor 51 controls, in ACT532, the communication interface 54 to transmit a frozen-food-warning-notification command to the information terminal in which the target cart ID has been set and to the monitoring terminal 20. With this control, the communication interface 54 transmits the frozen-food-warning-notification command to the network 70. The frozen-food-warning-notification command includes a counter value of the freezing timer T2 together with the cart ID. The frozen-food-warning-notification command is wirelessly transmitted from the access point 30 via the network 70, and received by the information terminal 10 in which the target cart ID has been set and by the monitoring terminal 20.

The operations of the information terminal 10 and the monitoring terminal 20 that have received the frozen-food-warning-notification command will be described below. In the case where the processor 51 has controlled the transmission of the frozen-food-warning-notification command, the processing of the processor 51 returns to ACT501 shown in FIG. 18.

In the case where the freezing status S2 is "3" in ACT530, the frozen-food-warning-notification command has already been transmitted. In the case where the processor 51 determines that the freezing status S2 is "3" (YES in ACT530), the processing of the processor 51 proceeds to ACT526. The processor 51 controls, in ACT526, the communication interface 54 to transmit the frozen-food-progress-notification command to the information terminal 10 in which the target cart ID has been set and to the monitoring terminal 20. Then, the processing of the processor 51 proceeds to ACT501 shown in FIG. 18.

In ACT501, the processor 51 determines again whether or not the transaction file 521 that has not been processed in the interrupting processing is present. In the case where the transaction file 521 that has not been processed is present, the processor 51 acquires the cart ID of the transaction file 521 and executes the processing of ACT503 to ACT514 and ACT521 to ACT532 as described above.

In the case where the processor 51 determines that the transaction file 521 that has not been processed is not present (NO in ACT501), the processor 51 finishes the timer interrupting processing.

As described above, the virtual POS server 50 periodically transmits the refrigerated-food-progress-notification command, the refrigerated-food-caution-notification command, or the refrigerated-food-warning-notification command to the information terminal 10 in which a refrigerated food has been registered as a to-be-purchased product. Similarly, the virtual POS server 50 periodically transmits the frozen-food-progress-notification command, the frozen-food-caution-notification command, or the frozen-food-warning-notification command to the information terminal 10 in which a frozen food has been registered as a to-be-purchased product.

Now, FIG. 12 will be described again. In the case where the processor 11 determines that a notification command has been received (YES in ACT107) in the standby state in ACT106 to ACT108, the processing of the processor 51 proceeds to ACT110. The processor 11 executes, in ACT110, notification processing corresponding to the type of the notification command.

For example, in the case of receiving the refrigerated-food-initial-notification command, the processor 11 executes processing for reproducing the sound "a refrigerated food has been registered" from the speaker 19. For example, in the case of receiving the frozen-food-initial-notification command, the processor 11 executes processing for reproducing the sound "a frozen food has been registered" from the speaker 19. With such processing, it is possible to make a customer who is a purchaser aware that he/she purchases a refrigerated food or a frozen food.

For example, in the case of receiving the refrigerated-food-progress-notification command, the processor 11 executes processing of causing a product registration screen LS1 of the touch panel 15 to display the count value of the refrigeration timer T1 as the elapsed time since a refrigerated food has been registered. For example, in the case of receiving the frozen-food-progress-notification command, the processor 11 executes processing of causing the product registration screen LS1 of the touch panel 15 to display the count value of the freezing timer T2 as the elapsed time since a frozen product has been registered.

FIG. 23 illustrates a display example of a product registration screen LS2 displayed on the touch panel 15 of the information terminal 10 used by the customer M1 in which a refrigerated food and a frozen food have been registered as to-be-purchased products. As shown in FIG. 23, the elapsed time since a refrigerated food has been registered and the elapsed time since a frozen food has been registered are displayed in the area AR3 including a button image. Therefore, the customer M1 can easily know the elapsed time since a refrigerated food or a frozen food has been registered.

For example, in the case of receiving the refrigerated-food-caution-notification command or the frozen-food-caution-notification command, the processor 11 executes processing of causing the product registration screen LS1 of the touch panel 15 to display a screen that warns the customer to hurry to make a payment. Further, the processor 11 controls the speaker 19 to emit a buzzer sound calling attention from the speaker 19.

Figure 24:
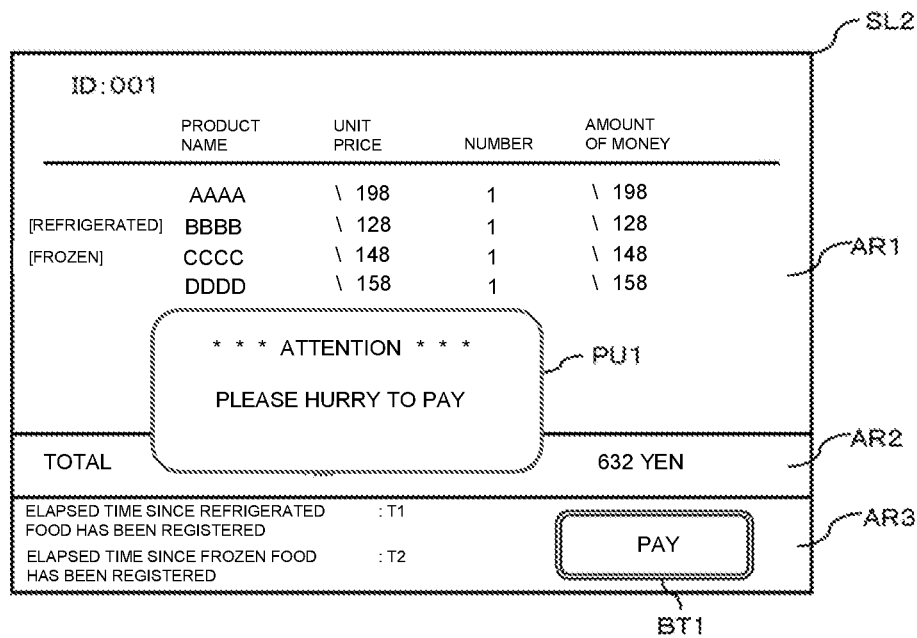
FIG. 24 is a schematic diagram illustrating an example of the product registration screen displayed on the touch panel of the information terminal according to the embodiment.

FIG. 24 illustrates a display example of the product registration screen LS2 displayed on the touch panel 15 of the information terminal 10 that has received the refrigerated-food-caution-notification command or the frozen-food-caution-notification command. As shown in FIG. 24, an image PU1 including a message that urges the customer to hurry to make a payment is displayed on the product registration screen LS2 as a pop-up. Therefore, it is possible to urge the customer M1 for whom the refrigerating caution period or the freezing caution period has elapsed since a refrigerated food or a frozen food was registered as a to-be-purchased product to promptly make a payment.

For example, in the case of receiving the refrigerated-food-warning-notification command or the frozen-food-warning-notification command, the processor 11 executes processing of causing the product registration screen LS1 of the touch panel 15 to display an image that warns the customer to make a payment immediately. Further, the processor 11 controls the speaker 19 to emit a buzzer sound calling attention from the speaker 19. The buzzer sound at this time may be different from that emitted when the refrigerated-food-caution-notification command or the frozen-food-caution-notification command has been received.

Figure 25:
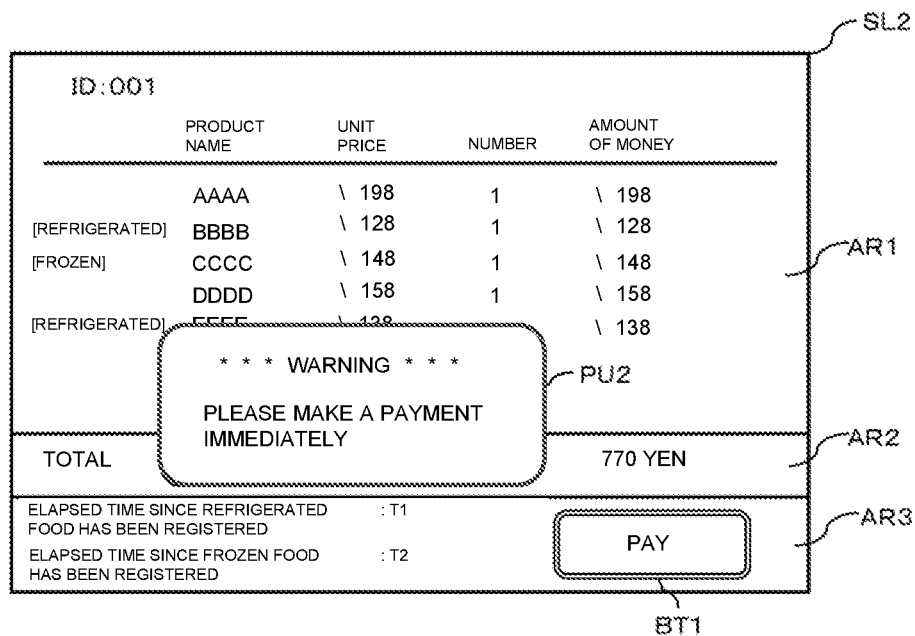
FIG. 25 is a schematic diagram illustrating an example of the product registration screen displayed on the touch panel of the information terminal according to the embodiment.

FIG. 25 illustrates a display example of the product registration screen LS2 displayed on the touch panel 15 of the information terminal 10 that has received the refrigerated-food-warning-notification command or the frozen-food-warning-notification command. As shown in FIG. 25, an image PU2 including a message that warns the customer to make a payment immediately is displayed on the product registration screen LS2 as a pop-up. Therefore, it is possible to warn the customer M1 for whom the refrigeration warning period or the freezing warning period has elapsed since a refrigerated food or a frozen food has been registered as a to-be-purchased product to forcibly make a payment.

Incidentally, various notification commands are transmitted not only to the information terminal 10 but also to the monitoring terminal 20. The processor 21 of the monitoring terminal 20 that has received a notification command starts the processing in the procedure shown in FIG. 21.

As shown in FIG. 21, the processor 21 detects, in ACT601, the cart ID from the above-mentioned notification command first. The processor 21 selects, in ACT602, the tag image 251 on which the corresponding cart ID is displayed.

The processor 21 determines, in ACT603, whether or not the notification command is a refrigerated-food-initial-notification command and whether or not the notification command is a frozen-food-initial-notification command. In the case where the processor 21 determines that the notification command is an initial notification command (YES in ACT603), the processing of the processor 21 proceeds to ACT604. The processor 21 determines, in ACT604, whether or not the symbol included in the tag image 251 us "X". In the case where the processor 21 determines that the symbol included in the tag image 251 us "X" (YES in ACT604), the processing of the processor 21 proceeds to ACT605. The processor 21 changes, in ACT605, the symbol from "X" to "O".

In the case where the processor 21 determines that the notification command is not an initial notification command (NO in ACT603), the processing of the processor 21 proceeds to ACT606. The processor 21 determines, in ACT606, whether or not the notification command is a refrigerated-food-progress-notification command and whether or not the notification command is a frozen-food-progress-notification command. In the case where the processor 21 determines that the notification command is any of the progress-notification commands (YES in ACT606), the processing of the processor 21 proceeds to ACT607. The processor 21 changes, in ACT607, the value of the refrigerated food housing period U1 or the frozen food housing period U2 included in the tag image 251 to the value of the refrigeration timer T1 or the freezing timer T2 included in the notification command.

In the case where the processor 21 determines that the notification command is not any of the progress-notification commands (NO in ACT606), the processing of the processor 21 proceeds to ACT608. The processor 21 determines, in ACT608, whether or not the notification command is a refrigerated-food-caution-notification command and whether or not the notification command is a frozen-food-caution-notification command. In the case where the processor 21 determines that the notification command is any of the caution-notification commands (YES in ACT608), the processing of the processor 21 proceeds to ACT609. The processor 21 determines, in ACT609, whether or not the symbol included in the tag image 251 is "O". In the case where the processor 21 determines that the symbol included in the tag image 251 is "O" (YES in ACT609), the processing of the processor 21 proceeds to ACT610. The processor 21 changes, in ACT610, the symbol from "O" to "A". Further, the processor 21 changes, in ACT611, the values of the refrigerated food housing period U1 or the frozen food housing period U2 included in the tag image 251 to the value of the refrigeration timer T1 or the freezing timer T2 included in the notification command.

In the case where the processor 21 determines that the notification command is not any of the caution-notification commands (NO in ACT608), the processing of the processor 21 proceeds to ACT612. The processor 21 determines, in ACT612, whether or not the notification command is a refrigerated-food-warning-notification command and whether or not the notification command is a frozen-food-warning-notification command. In the case where the processor 21 determines that the notification command is any of the warning-notification commands (YES in ACT612), the processing of the processor 21 proceeds to ACT613. The processor 21 determines, in ACT613, whether or not the symbol included in the tag image 251 is "A". In the case where the processor 21 determines that the symbol included in the tag image 251 is "A" (YES in ACT613), the processing of the processor 21 proceeds to ACT614. The processor 21 changes, in ACT614, the symbol from "A" to "W". Further, the processor 21 changes, in ACT615, the value of the refrigerated food housing period U1 or the frozen food housing period U2 included in the tag image 251 to the refrigeration timer T1 or the freezing timer T2 included in the notification command.

In this way, the processor 21 finishes the processing executed when receiving a notification command. Note that in the case where the processor 21 determines that the above-mentioned symbol is a symbol other than the symbol "X" (NO in ACT604), that the above-mentioned symbol is a symbol other than the symbol "O" (NO in ACT609), or that the above-mentioned symbol is a symbol other than the symbol "A" (NO in ACT613), the processor 21 finishes the processing executed when receiving a notification command.

Now, FIG. 12 will be described again. The customer who makes a payment touches the payment button BT1 of the product registration screen LS2 as described above. In the case where the processor 11 detects that the payment button BT1 has been touched in the standby state in ACT106 to ACT108, i.e., in the case where the processor 11 determines that a payment is instructed (YES in ACT108), the processing of the processor 11 proceeds to ACT111 shown in FIG. 13. The processor 11 controls, in ACT111, the wireless unit 14 to transmit a payment command to the virtual POS server 50. With this control, the wireless unit 14 wirelessly transmits a payment command to the access point 30. The payment command is received by the access point 30, and transmitted to the virtual POS server 50 via the network 70. The payment command includes the cart ID of the information terminal 10.

Figure 20:
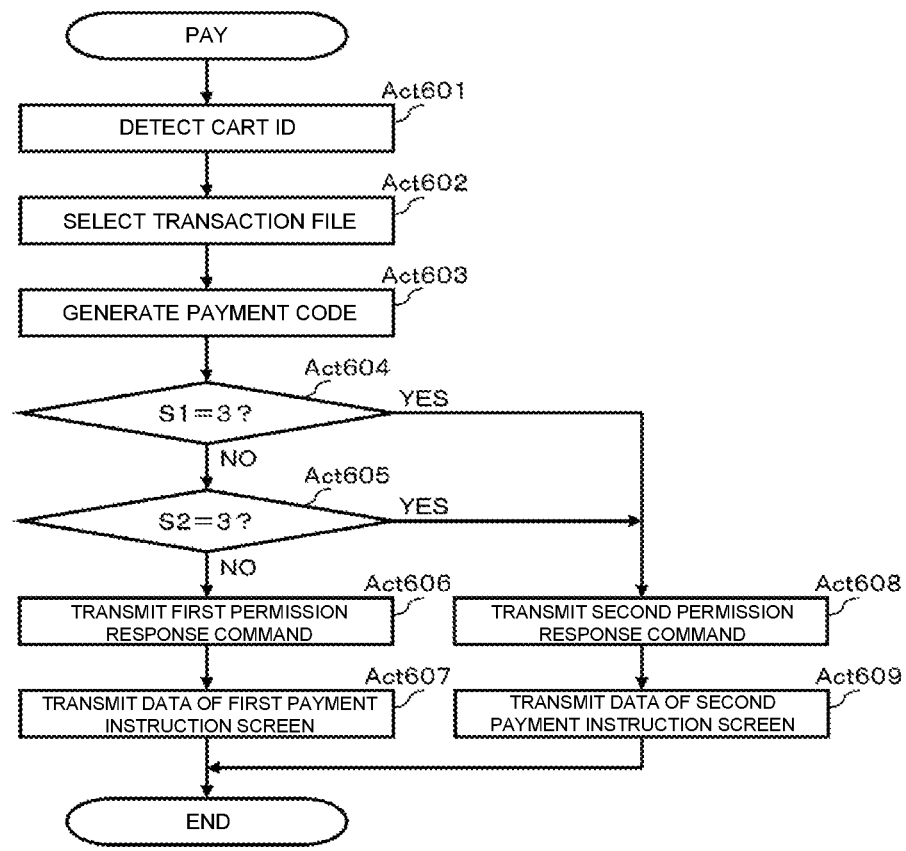
FIG. 20 is a flowchart illustrating payment processing executed by the processor of the virtual POS server according to the embodiment.
Figure 21:
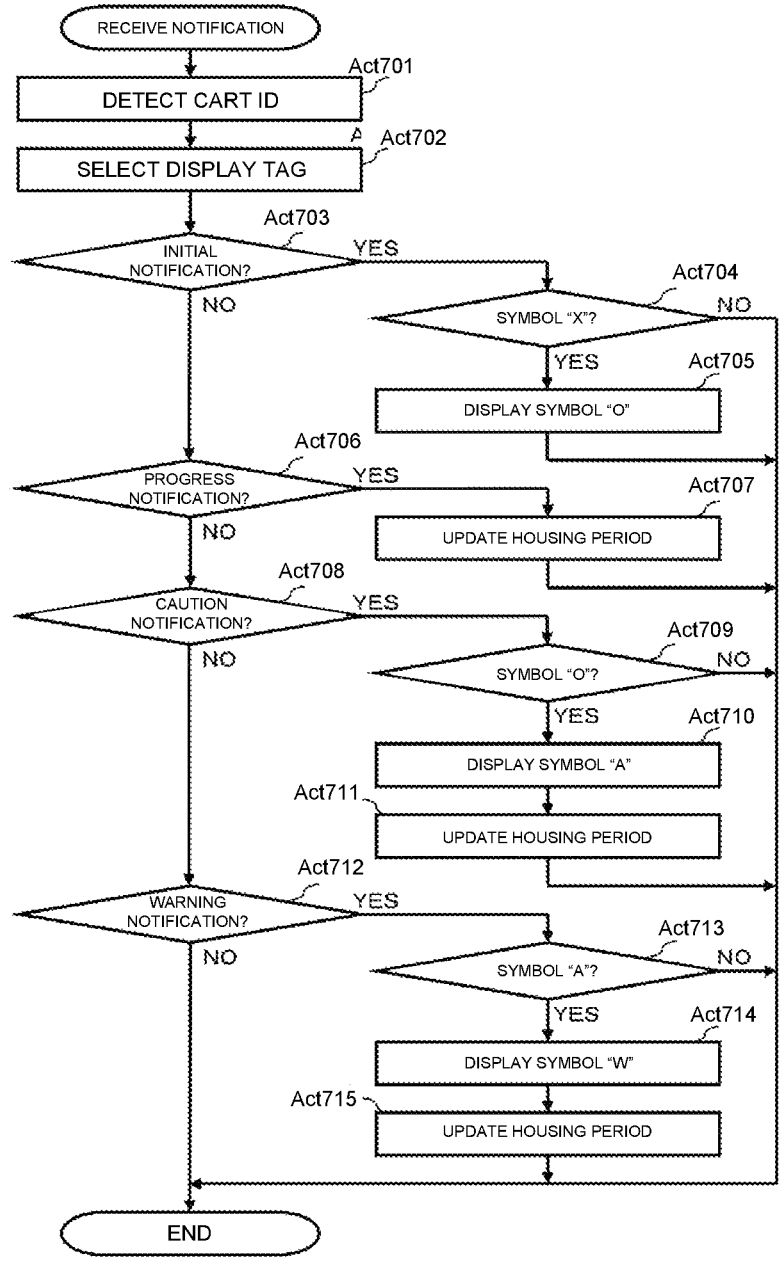
FIG. 21 is a flowchart illustrating notification reception processing executed by a processor of the monitoring terminal according to the embodiment.

The processor 51 of the virtual POS server 50 starts the payment processing in the procedure shown in FIG. 20 in the case where the received command is a payment command. As shown in FIG. 20, the processor 51 detects, in ACT601, the cart ID from the payment command. The processor 51 selects, in Act602, the transaction file 521 in which the cart ID has been described, as a payment target. In the following description, the transaction file 521 that is a payment target will be referred to as the transaction file 521B. Further, the cart ID included in the transaction file 521B will be referred to as the payment cart ID.

The processor 51 generates, in ACT603, a new payment code. For example, the processor 51 generates a unique payment code by combining the current date and time and the payment cart ID.

The processor 51 determines, in ACT604, whether or not the refrigeration status S1 corresponding to the payment cart ID is "3" with reference to the cart management table 522. In the case where the processor 51 determines that the refrigeration status S1 is not "3" (NO in ACT604), the processing of the processor 51 proceeds to ACT605. The processor 51 determines, in ACT605, whether or not the freezing status S2 corresponding to the payment cart ID is "3". In the case where the processor 51 determines that also the freezing status S2 is not "3" (NO in ACT605), the processing of the processor 51 proceeds to ACT606. The processor 51 controls, in ACT606, the communication interface 54 to transmit a first permission response command to the information terminal 10 that has transmitted the payment command. Further, the processor 51 controls, in ACT607, the communication interface 54 to transmit data of a first payment instruction screen to the information terminal 10. With such control, the communication interface 54 transmits the first permission response command and the data of the first payment instruction screen to the network 70.

The first permission response command is a command for notifying that the data of the first payment instruction screen is to be transmitted. An example of the first payment instruction screen will be described below. The first permission response command and the data of the first payment instruction screen are wirelessly transmitted from the access point 30 via the network 70 and received by the information terminal 10 that has transmitted the payment command.

In the case where the processor 51 has controlled the transmission of the first permission response command and the data of the first payment instruction screen in ACT607, the processor 51 finishes the payment processing.

In the case where the processor 51 determines that the refrigeration status S1 corresponding to the payment cart ID is "3" (YES in ACT604) or that the freezing status S2 is "3" in ACT605 (YES in ACT605), the processing of the processor 51 proceeds to ACT608. The processor 51 controls, in ACT608, the communication interface 54 to transmit a second permission response command to the information terminal 10 that has transmitted the payment command. Further, the processor 51 controls, in ACT609, the communication interface to transmit the data of a second payment instruction screen to the information terminal 10. With such control, the communication interface 54 transmits the second permission response command and the data of the second payment instruction screen to the network 70.

The second permission response command is a command for notifying that the data of the second payment instruction screen is to be transmitted. An example of the second payment instruction screen will be described below. The second permission response command and the data of the second payment instruction screen are wirelessly transmitted from the access point 30 via the network 70 and received by the information terminal 10 that has transmitted the payment command.

In the case where the processor 51 has controlled the transmission of the second permission response command and the data of the second payment instruction screen in ACT609, the processor 51 finishes the payment processing shown in FIG. 20.

Now, FIG. 13 will be described again. The processor 11 of the information terminal 10 that has controlled the transmission of the payment command stands by for a response command from the virtual POS server 50 in Act111. Upon receiving a response command, the processor 11 determines, in ACT112, whether or not the response command is a first permission response command. In the case where the processor 11 determines that the received response command is not a first permission response command (NO in ACT112), the processing of the processor 11 proceeds to ACT113. The processor 11 determines, in ACT113, whether or not the response command is a second permission response command. In the case where the processor 11 determines that the received response command is not a second permission response command (NO in ACT113), the processor 11 regards it as an error.

In the case where the processor 11 determines that the received response command is a first permission response command (YES in ACT112), the processing of the processor 11 proceeds to ACT114. The processor 11 causes, in ACT114, the touch panel 15 to display a first payment instruction screen SL3 (see FIG. 26) on the basis of the data of the first payment instruction screen received together with the first permission response command.

Figure 26:
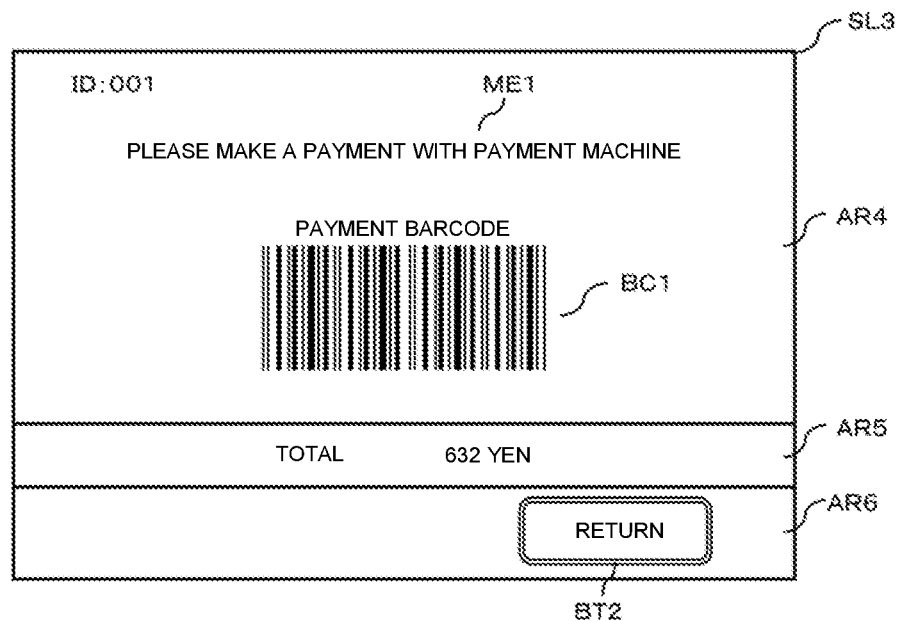
FIG. 26 is a schematic diagram illustrating an example of a first payment instruction screen displayed on the touch panel of the information terminal according to the embodiment.

FIG. 26 schematically illustrates an example of the first payment instruction screen SL3. As shown in FIG. 26, an area AR4 for displaying a payment barcode, an area AR5 for displaying the total amount of money, and an area AR6 including a button image are formed in the first payment instruction screen SL3. A payment barcode BC1 that shows a payment code in a barcode system is displayed in the area AR4 together with a message ME1 urging the customer to make a payment with a payment device. Further, a return button BT2 is displayed in the area AR6. The return button BT2 is an operator that is touch-operated in the case where the customer cancels the payment and returns to shopping.

The customer M1 who has checked the first payment instruction screen SL3 moves to the payment area R and operates an open payment device 40 to make a payment. Specifically, the customer M1 causes the scanner of the payment device 40 to read the payment barcode BC1 displayed on the first payment instruction screen SL3. Then, the payment device 40 analyzes the read payment barcode BC1 to acquire a payment code. The payment device 40 transmits the acquired payment code to the virtual POS server 50. The virtual POS server 50 searches for the transaction file 521 describing the cart ID included in the payment code. The data of a list of to-be-purchased products stored in the searched transaction file 521 is downloaded to the payment device 40. After that, the payment device 40 performs, on the basis of the data of the list of to-be-purchased products, payment processing using a payment method such as cash payment, credit payment, and electronic money payment. Upon finishing the payment processing, the payment device 40 transmits a payment finishing command to the information terminal 10 via the virtual POS server 50.

In the case where the processor 11 determines that the received response command is a second permission response command (YES in ACT113), the processing of the processor 11 proceeds to ACT115. The processor 11 causes, in ACT115, the touch panel 15 to display a second payment instruction screen SL4 (see FIG. 27) on the basis of the data of the second payment instruction screen received together with the second permission response command.

Figure 27:
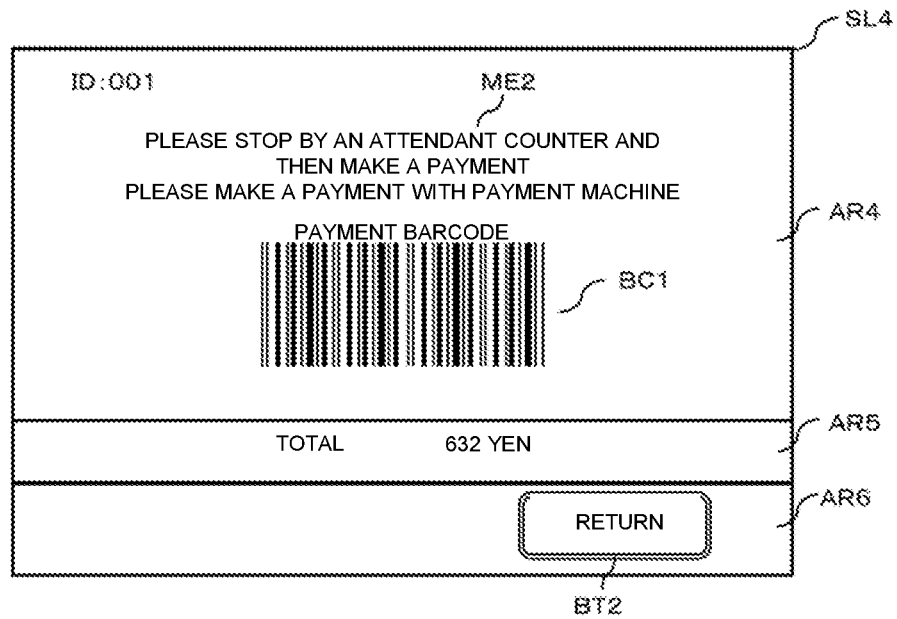
FIG. 27 is a schematic diagram illustrating an example of a second payment instruction screen displayed on the touch panel of the information terminal according to the embodiment.

FIG. 27 schematically illustrates an example of the second payment instruction screen SL4. As shown in FIG. 27, the difference between the second payment instruction screen SL4 and the first payment instruction screen SL3 is the content of a message ME2 displayed on the area AR4. Specifically, the message ME2 instructing the customer to stop at an attendant counter and then make a payment is displayed on the second payment instruction screen SL4 together with the payment barcode BC1.

Therefore, the customer M1 who has checked the second payment instruction screen SL4 stops at the attendant counter AT first. The fact that the second payment instruction screen SL4 is displayed means that the refrigeration status S1 or the freezing status S2 associated with the cart ID of the information terminal 10 used by the customer M1 is "3". That is, the fact that the second payment instruction screen SL4 is displayed means that the elapsed time since a refrigerated food or a frozen food was registered has reached the refrigeration warning period or the freezing warning period. At this time, in the monitoring terminal 20, the tag image 251 (see FIG. 11) corresponding to the cart ID includes the symbol "W" representing a warning. In this regard, the attendant M2 takes out the refrigerated food or frozen food for which the warning period has been elapsed from the to-be-purchased products of the customer M1 and replaces it with a new one. By doing so, it is possible to prevent the damaged refrigerated food or melted frozen food from being taken out of the store.

Then, the customer M1 moves to the payment area R and makes a payment by the payment device 40. As described above, the payment finishing command is transmitted from the payment device 40 to the information terminal 10 in the case where the customer M1 has made a payment.

Now, FIG. 13 will be described again. The processor 11 that has displayed the first payment instruction screen SL3 or the second payment instruction screen SL4 stands by for a payment finishing command in ACT116. Upon receiving a payment finishing command (YES in ACT116), the processing of the processor 11 proceeds to ACT117. The processor 11 clears, in ACT117, the screen of the touch panel 15. In this way, the processor 11 finishes the processing shown in FIG. 12 and FIG. 13.

Note that the processor 51 of the virtual POS server 50 executes the processing of ACT303 to ACT307 shown in FIG. 15, thereby configuring a specification unit. That is, the processor 51 specifies a product selected as a to-be-purchased product on the basis of the product code included in the product registration command received from the information terminal 10.

Further, the processor 51 executes the processing of ACT309 and ACT311 shown in FIG. 15, the processing of ACT501 to ACT504 shown in FIG. 18, and the processing of ACT521 and ACT522 shown in FIG. 19, thereby configuring a time measurement unit. That is, the processor 51 measures, in the case where the specified product is a time-sensitive product like a refrigerated food or a frozen food, an elapsed time since the product has been specified, by incrementing the refrigeration timer T1 or the freezing timer T2.

Further, the processor 51 executes the processing of ACT505 to ACT514 shown in FIG. 18 and the processing of ACT523 to ACT532 shown in FIG. 19, configuring a notification unit. That is, the processor 51 transmits a caution-notification command in the case where the elapsed time since a refrigerated food was registered as a to-be-purchased product or the elapsed time since a frozen food was registered as a to-be-purchased product exceeds the caution period. The processor 51 transmits a warning-notification command in the case where the elapsed time since a refrigerated food was registered as a to-be-purchased product or the elapsed time since a frozen food was registered as a to-be-purchased product exceeds the warning period.

As described above, the processor 51 of the virtual POS server 50 according to the embodiment executes functions as the specification unit, the time measurement unit, and the notification unit. Therefore, in accordance with this embodiment, it is possible to manage the quality of a time-sensitive to-be-purchased product such as a refrigerated food and a frozen food such that the quality of the to-be-purchased product does not significantly deteriorate during the time from when a customer selected the to-be-purchased product to when the payment is finished.

In particular, the processor 51 outputs a caution-notification command and a warning-notification command not only to the information terminal 10 used by the customer M1 who is a purchaser but also to the monitoring terminal 20 used by the attendant M2 who is a clerk of the attendant counter AT. Therefore, it is possible to not only make the customer M1 aware the quality of a refrigerated food, a frozen food, or the like, but also easily take measures with good serviceability, e.g., replacing a product whose quality has deteriorated with a new one by the attendant M2.

In addition, the processor 51 acquires the warning period corresponding to the time period to which the current date belongs from a set time table. The processor 51 transmits a warning-notification command in the case where the elapsed time has reached the warning period. In addition, the processor 51 calculates the caution period on the basis of the warning period. The processor 51 transmits a caution-notification command in the case where the elapsed time has reached the caution period. Therefore, it is possible for a manager to appropriately manage the quality of a product without worrying about the temperature, humidity, and the like.

Further, the processor 51 executes the processing of ACT407 shown in FIG. 16 and the processing of ACT417 shown in FIG. 17, thereby configuring a notification unit. That is, the processor 51 performs notification by transmitting an initial-notification command in the case where the specified product is a time-sensitive product such as a refrigerated food and a frozen food. Also in this case, the processor 51 outputs the initial-notification command not only to the information terminal 10 used by the customer M1 who is a purchaser but also to the monitoring terminal 20 used by the attendant M2 who is a clerk of the attendant counter AT. Therefore, it is possible to make not only the customer M1 but also the attendant M2 aware that a refrigerated food or a frozen food has been registered as a to-be-purchased product.

Although a product management apparatus according to the embodiment, which is capable of managing the quality of a to-be-purchased product such that the quality of the to-be-purchased product does not significantly deteriorate during the time from when the to-be-purchased product was selected to when the payment is finished, has been described, the present disclosure is not limited to such an embodiment.

For example, although the self-registration system 1 in which the information terminal 10 is attached to the cart C has been illustrated in the above-mentioned embodiment, the information terminal 10 does not necessarily need to be attached to the cart C. For example, the product management apparatus according to this embodiment can be similarly applied also to a self-registration system in which a customer holds an information terminal such as a smartphone and a to-be-purchased product is registered.

Although the case where a product management apparatus (virtual POS server 50) outputs a notification command to both the information terminal 10 and the monitoring terminal 20 has been illustrated in the above-mentioned embodiment, the notification command may be output only to one of the terminals. For example, the product management apparatus may output a notification command only to the information terminal 10, which makes it possible to notify the purchaser who uses the information terminal 10 of the elapsed time since a refrigerated food or a frozen food was registered, the fact that the elapsed time has exceeded the caution period, the fact that the elapsed time has reached the warning period, and the like. By this notification, it is possible to prevent the quality of a refrigerated food, a frozen food, or the like from deteriorating. Meanwhile, the product management apparatus may output a notification command only to the monitoring terminal 20, which makes it possible to notify a clerk such as the attendant M2 of that there is a customer for whom a certain time has elapsed since a refrigerated food or a frozen food was registered, which is effective.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A product management apparatus, comprising:
 a communication interface configured to transmit/receive a command to/from a terminal for product registration, the received command including a product registration command including a product code for specifying a to-be-purchased product and identification information for identifying the terminal, the transmitted command including a notification command;
 a timer; and
 a processor configured to:
  upon receipt of the product registration command via the communication interface, detect the product code and the identification information, specify a product as a to-be-purchased product on a basis of the detected product code, and store in a memory the product code of the to-be-purchased product in association with the detected identification information,
  determine whether the specified to-be-purchased product is a time-sensitive product, and upon determining that the specified to-be-purchased product is the time-sensitive product, acquire a current time using the timer, and
  control the communication interface to transmit the notification command to the terminal when a predetermined time has elapsed since the acquired time.

2. The product management apparatus according to claim 1, further comprising
 a storage device that stores a product master table and a management table, the product master table storing the product code in association with a refrigerated category and a frozen category, wherein the processor is further configured to:
  determine that a product specified by a product code in the refrigerated category is a refrigerated product that is a time-sensitive product and a product specified by a product code in the frozen category is a frozen product that is a time-sensitive product,
  set, in the management table, a first warning time based on a first time acquired when the to-be-purchased product is determined as the refrigerated product, and a second warning time based on a second time acquired when the to-be-purchased product is determined as the frozen product, and
  control the communication interface to transmit the notification command when either the first warning time or the second warning time expires after the acquired time, whichever is earlier.

3. The product management apparatus according to claim 1, wherein
  the processor is further configured to control the communication interface to transmit the notification command to at least one of a terminal used by a purchaser who purchases the to-be-purchased product or a terminal used by a clerk.

4. The product management apparatus according to claim 1, wherein
  the processor is further configured to control the communication interface to transmit a first notification command when a first predetermined time has elapsed since the acquired time, and a second notification command when a second predetermined time longer than the first predetermined time has elapsed since the acquired time.

5. The product management apparatus according to claim 1, further comprising:
  a storage device that stores a time table in which a warning period is stored in association with each of a plurality of groups of dates within a year, wherein
  the processor is further configured to, when the specified to-be-purchased product is determined to be a time-sensitive product:
    acquire a current date,
    specify one of the groups of dates corresponding to the acquired date,
    determine the warning period associated with the specified group of dates, and
    control the communication interface to transmit the notification command when the determined warning period has elapsed since the acquired time.

6. A product management method for a product management apparatus, comprising:
  receiving, from a terminal for product registration via a communication interface, a product registration command including a product code for specifying a to-be-purchased product and identification information for identifying the terminal;
  detecting the product code and the identification information from the received product registration command, specifying a product as a to-be-purchased product on a basis of the detected product code, and storing in a memory the product code of the to-be-purchased product in association with the detected identification information;
  determining whether the specified to-be-purchased product is a time-sensitive product, and upon determining that the specified to-be-purchased product is the time-sensitive product, acquiring a current time using a timer; and
  transmitting a notification command to the terminal when a predetermined time has elapsed since the acquired time.

7. The product management method for a product management apparatus according to claim 6, further comprising:
  storing a product master table and a management table, the product master table storing the product code in association with a refrigerated category and a frozen category;
  determining that a product specified by a product code in the refrigerated category is a refrigerated product that is a time-sensitive product and a product specified by a product code in the frozen category is a frozen product that is a time-sensitive product; and
  setting, in the management table, a first warning time based on a first time acquired when the to-be-purchased product is determined as the refrigerated product, and a second warning time based on a second time acquired when the to-be-purchased product is determined as the frozen product, wherein
  the notification command is transmitted when either the first warning time or the second warning time expires after the acquired time, whichever is earlier.

8. The product management method for a product management apparatus according to claim 6, wherein
  the step of transmitting the notification command includes transmitting, via the communication interface, the notification command to at least one of a terminal used by a purchaser who purchases the to-be-purchased product or a terminal used by a clerk.

9. The product management method for a product management apparatus according to claim 6, wherein
  the step of transmitting the notification command includes transmitting a first notification command when a first predetermined time has elapsed since the acquired time, and a second notification command when a second predetermined time longer than the first predetermined time has elapsed since the acquired time.

10. The product management method for a product management apparatus according to claim 6, further comprising:
  storing a set time table in which a warning period is stored in association with each of a plurality of groups of dates within a year;
  acquiring a current date;
  specifying one of the groups of dates corresponding to the acquired date; and
  determining the warning period associated with the specified group of dates, wherein
  the step of transmitting the notification command includes transmitting the notification command when the determined warning period has elapsed since the acquired time.

* * * * *